United States Patent
Endicott et al.

(10) Patent No.: US 6,715,148 B1
(45) Date of Patent: Mar. 30, 2004

(54) EFFICIENT METHOD ROUTER THAT SUPPORTS MULTIPLE SIMULTANEOUS OBJECT VERSIONS

(75) Inventors: John Clarence Endicott, Rochester, MN (US); Steven Jay Munroe, Rochester, MN (US); Robert Peter Resch, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 09/033,614

(22) Filed: Mar. 3, 1998

Related U.S. Application Data

(62) Division of application No. 08/415,392, filed on Apr. 3, 1995, now Pat. No. 5,768,588.

(51) Int. Cl.⁷ .................................................. G06F 9/00
(52) U.S. Cl. .................................................... 719/316
(58) Field of Search .................................. 709/315, 316

(56) References Cited

U.S. PATENT DOCUMENTS

| | | | |
|---|---|---|---|
| 4,809,170 A | 2/1989 | Leblang et al. | 364/200 |
| 4,853,843 A | 8/1989 | Ecklund | 364/200 |
| 5,093,914 A | 3/1992 | Coplien et al. | 395/700 |
| 5,187,786 A | 2/1993 | Densmore et al. | 395/600 |
| 5,247,669 A | 9/1993 | Abraham et al. | 395/700 |
| 5,261,098 A | 11/1993 | Katin et al. | 395/650 |
| 5,265,206 A | 11/1993 | Shackelford et al. | 395/200 |
| 5,280,610 A | 1/1994 | Travis, Jr. et al. | 395/600 |
| 5,291,593 A | 3/1994 | Abraham et al. | 395/600 |
| 5,297,279 A | 3/1994 | Bannon et al. | 395/600 |
| 5,297,284 A | 3/1994 | Jones et al. | 395/700 |
| 5,327,562 A | 7/1994 | Adcock | 395/700 |
| 5,339,430 A | 8/1994 | Lundin et al. | 395/700 |
| 5,339,438 A | 8/1994 | Conner et al. | 395/700 |
| 5,361,350 A | 11/1994 | Conner et al. | 395/600 |
| 5,367,635 A | 11/1994 | Bauer et al. | 395/200 |
| 5,371,891 A | 12/1994 | Gray et al. | 395/700 |
| 5,386,564 A | 1/1995 | Shearer et al. | 395/650 |
| 5,418,964 A | 5/1995 | Conner et al. | 395/700 |
| 5,421,016 A | 5/1995 | Conner et al. | 395/700 |
| 5,428,792 A | 6/1995 | Conner et al. | 395/700 |
| 5,432,936 A | 7/1995 | Gray et al. | 395/700 |
| 5,475,817 A | 12/1995 | Waldo et al. | 395/650 |
| 5,493,680 A | 2/1996 | Danforth | 395/700 |

OTHER PUBLICATIONS

"Commom LISP with CLOS," Computer Language, vol.: v8, Issue: n3 PAGINATION: p. 82(1), Mar. 1991.

(List continued on next page.)

*Primary Examiner*—St. John Courtenay III
(74) *Attorney, Agent, or Firm*—Steven W. Roth

(57) ABSTRACT

OOP environments comprise composite data structures and internal mechanisms for manipulating those structures. The structures are used to allow a user to realize the power of OOP. Hence, the layout of these structures, the way in which the structures inter-relate, and the manner in which they are built and used are all critical to the utility of a particular OOP environment. It is no surprise, then, that manufacturers and suppliers of OOP environments are constantly striving to design composite data structures and internal mechanisms which maximize user productivity. The internal mechanisms and structures that make up the present invention are collectively referred to as the New Object Model (NOM). The composite data structures and organization of the NOM OOP environment provide significant benefits that are not provided by the environments of the prior art. These benefits include: a more efficient method resolution scheme and the ability to add method programs and object instance data to a class definition without the need to recompile the majority of the code base.

8 Claims, 21 Drawing Sheets

OTHER PUBLICATIONS

T. Williams, "Toolnet Offers Embedded Object–Oriented Development Based on Smalltalk," Computer Design, vol.: v30, Issue: n7 PAGINATION: p. 108(1), Apr. 1, 1991.

R. Gabriel, "Solving the Software Crisis," UNIX Review, vol.: v9, Issue: n7 PAGINATION: p 27(4), Jul. 1991.

B. Schneier, "Dylan: a new language is blowin' in the wind. (Apple developing Dylan object–oriented programming language for its Newton Personal Digital Assistant)," MacWeek, vol. 6, No. 32, p. 16(1), Sep. 14, 1992.

D. Pountain, "Oberon: Modula's Children, Part II, A distillation of the best features from Pascal and Modula–2, Oberon is smaller, less complex, and more user–extensible," BYTE, vol. 16, No. 3, p. 135, Mar. 1991.

G. Kaiser et al., "An object model for shared data," 1990 International Conference on Computer Languages, Conference Paper, pp. 136–144.

R. Agrawal et al., "OdeView: the graphical interface to Ode," Journal: SIGMOD Record, vol. 19, No. 2, pp. 34–43, Jun. 1990.

W. Premeriani, et al., "An Object–Oriented Relational Database," Communications of the ACM, vol.: v33, Issue: n11 PAGINATION: p. 99(11), Nov. 1990.

P. de Lisle, "Putting OOP to Work for You," Data Based Advisor, vol.: v9, Issue: n 3 PAGINATION: p. 87 (4), Mar. 1991.

EFFICIENT METHOD ROUTER THAT SUPPORTS MULTIPLE SIMULTANEOUS OBJECT VERSIONS

REFERENCE TO PARENT APPLICATION

This is a division of application Ser. No. 08/415,392, now U.S. Pat. No. 5,768,588 filed Apr. 3, 1995, which is hereby incorporated by reference in its entirety.

FIELD OF THE INVENTION

This invention relates to the data processing field. More specifically, this invention relates to Object Oriented Programming environments.

BACKGROUND OF THE INVENTION

The development of the EDVAC computer system of 1948 is often cited as the beginning of the computer era. Since that time, computer systems have found their way into just about every aspect of the American life style. One reason for this proliferation is the ability of computer systems to perform a variety of tasks in an efficient manner. The mechanisms used by computer systems to perform these tasks are called computer programs.

Like computer systems themselves, the development of computer programs has evolved over the years. The EDVAC system used what was called a "one address" computer programming language. This language allowed for only the most rudimentary computer programs. By the early 1950s, scientists had developed mechanisms which could convert symbolic instructions that were reasonably understandable to humans into a form which could be understood by a computer system. Each computer system was designed to handle a specific group of these instructions. These groups of instructions are called instruction sets.

The next step in the development of computer programs was the notion of computer programming languages. Computer programming languages were even more understandable than symbolic instruction sets. Computer programs are written using a variety of computer programming languages. Once written, a computer program is compiled into instructions that are part of the instruction set of a particular computer system. FORTRAN is usually cited as one of the first languages to allow computer programs to be written independently of a particular instruction set. By the 1960s, improvements in computer programming languages led to computer programs that were so large and complex that it was difficult to manage and control their development and maintenance.

Hence, in the 1970s, focus was directed away from developing new programming languages towards the development of programming methodologies and environments which could better accommodate the increasing complexity and cost of large computer programs. One such methodology is the Object Oriented Programming (OOP) approach. OOP advocates claim that this approach to computer programming can improve the productivity of computer programmers by as much as twenty-five fold. Hence, while it has been some time since the OOP concept was originally developed, it is currently seen as the way of the future.

The two fundamental concepts of OOP are "encapsulation" and "reusability." Encapsulation means that information and the means for using the information are conceptually packaged into individual entities called "objects." The objects represent individual operations or groups of operations that can be performed by a computer system. The information contained in an object is called data and the means used to perform a particular operation upon the information is called a method. The idea of reusability is that the objects are made sufficiently generic so that they can be used by the methods of many other objects. Any program or method program that uses an object is said to be a client of that object (i.e., a client program). The client will call or invoke the object while specifying the method that is to be used. This is called method resolution.

Objects are also considered to be members of a particular "class" of objects. When objects are created they may be members of a particular class or they may be considered to be members of a subclass of a particular class. Objects that are created as members of a subclass are said to have "inherited" the characteristics (i.e., the data and methods) of the class to which they are a subclass (i.e., their super class). For example, consider a class of objects called Canine. The class will have data that describes objects of that class (i.e., name, color, number of eyes and legs, etc.) The class will also have methods defined which can be used to work with the data of the class. For example, an object of class Canine could be an object that represented a canine named REX that was black and had two eyes and four legs. A subclass of class Canine, class Dog, could further define class Canine to include data that indicated what type of canine was involved. For example, an object of class Dog could be created that represented a dog named Lassie that was white and brown, had two eyes, four legs, and was of type Collie. Class Canine would also, then, be considered a super class of class Dog. As objects and subclasses are added, a hierarchical tree structure is created. Each class, be it respectively referred to as a subclass or super class, is considered to be at a certain level in the hierarchical structure. In the example, class Dog, as a subclass of class Canine, would be at a level one greater than that of class Canine.

The two most well known environments which utilize these OOP concepts are the "C++" environment and the "Smalltalk" environment. The C++ environment is merely an extension to the existing "C" computer programming language. Hence, it is an extremely inflexible approach to OOP. Whenever data for a particular class of objects requires a change or whenever a method for a particular class of objects is to be added, all of the objects that are members of the changed class and all of the objects that are members of subclasses of the changed class must be recreated and their methods must be recompiled. Further, clients that depend upon objects of the changed class or upon objects which are members of a subclass of the changed class, must also be recompiled. While this may not seem particularly troublesome for the hypothetical Canine-Dog example presented above, it is extremely costly and time consuming for large systems that include many classes and subclasses.

The Smalltalk approach to OOP is an improvement over that of C++ in that it allows for the addition of methods without recompilation. However, this flexibility is not without cost. The designers of the Smalltalk OOP environment sacrificed efficient method resolution for the ability to add a method without recompilation. Moreover, while the Smalltalk approach to OOP does allow for the addition of methods to objects without incurring the expense of recreation and recompilation, the Smalltalk environment shares the C++ shortcomings for changes to object data.

Essentially, then, the OOP environments of today greatly reduce the productivity advantages that were to be realized by the OOP approach.

SUMMARY OF THE INVENTION

It is a principle object of this invention to provide an enhanced OOP environment.

It is another object of this invention to provide an enhanced method and apparatus for generating and storing the structures of an enhanced OOP environment.

It is still another object of this invention to provide an enhanced method and apparatus for routing on an object of an enhanced OOP environment.

It is yet another object of this invention to provide an enhanced method and apparatus for creating an enhanced OOP environment.

It is yet another object of this invention to provide an enhanced method and apparatus for creating versions of the classes of an enhanced OOP environment.

It is yet another object of this invention to provide an enhanced method and apparatus for changing the version of an object instance from one version to another.

These and other objects are accomplished by the OOP mechanisms and apparatus disclosed herein.

OOP environments comprise composite data structures and internal mechanisms for manipulating those structures. The structures are used to allow a user to realize the power of OOP. Hence, the layout of these structures, the way in which the structures inter-relate, and the manner in which they are built and used are all critical to the utility of a particular OOP environment. It is no surprise, then, that manufacturers and suppliers of OOP environments are constantly striving to design composite data structures and internal mechanisms which maximize user productivity.

The internal mechanisms and structures that make up the present invention are collectively referred to as the New Object Model (NOM). The composite data structures and organization of the NOM OOP environment provide significant benefits that are not provided by the environments of the prior art. These benefits include: a more efficient method resolution scheme and the ability to add method programs and object instance data to a class definition without the need to recompile the majority of the code base.

The NOM environment comprises three key composite data structures: the object structure, the interface table, and the method table. The object structure, which is similar in nature to existing OOP object structures, contains the data that characterizes the object and location information about the interface table. The object data is further broken down by class-level. Hence, each object contains as many sets of data as its class is deep in the particular hierarchical tree structure. The interface table contains an interface table entry for the class to which the object belongs and entries for each of the object's super classes (i.e., one entry for each level the class is deep in the particular hierarchical tree structure). Each entry contains a tuple. The tuple comprises location information about the method table for the subject class-level, an offset for the object data associated with that particular class-level, and a class signature. The location information is used to gain access to the method table, while the offset is used to gain access to the instance data stored in the object. The class signature is used as a safety mechanism to ensure that client programs are correctly invoking the function embodied in a particular method of a particular object. Client programs that do not provide a call signature that matches the class signature will not be allowed to invoke the selected method. The method table for a particular class level contains method table entries which themselves contain location information about individual method programs.

When a client program intends to make use of a function embodied in a particular object, it calls the object by specifying the object name and the name of the method program that is to be invoked. Calling an object is also referred to as "routing on" the object. When compiled, the NOM call statement comprises four pieces of information: an object ID, a level, a call signature, and a method offset. The object ID is used to locate and access the particular object. Once accomplished, the location information within the object is used to gain access to the interface table. The level is then used to locate the appropriate interface table entry. As stated, the call signature is used to match against the class signature for the class to which the selected method program is associated. If the signatures match, the location information within the subject interface table entry is used to gain access to the appropriate method table. The method offset is then used to access and invoke the correct method program.

If it becomes necessary to add an additional method program to a particular class, the computer programmer need only add another entry to the method table associated with that particular class. No recompilation of objects is required. Further only those client programs that need access to the new method program will require recompilation.

When a computer programmer wishes to add data to a particular class, the NOM environment allows him or her to simply create a new version of the class and reclassify only those objects that require the new data. Objects of older version are reclassified when and if it becomes necessary.

In addition, the NOM environment provides internal mechanisms which support its composite data structures. These include version and object managers and a class definition utility. The version manager is used to create versions of classes such that several versions of the same class can co-exist. The object manager supports the creation of object instances, while the class definition utility supports the definition of new classes.

BRIEF DESCRIPTION OF THE DRAWINGS

FIGS. 3A-1, 3A-2, and 3B are flow diagrams that show a NOM OOP environment is created.

DESCRIPTION OF THE PREFERRED EMBODIMENT

Figure 1:
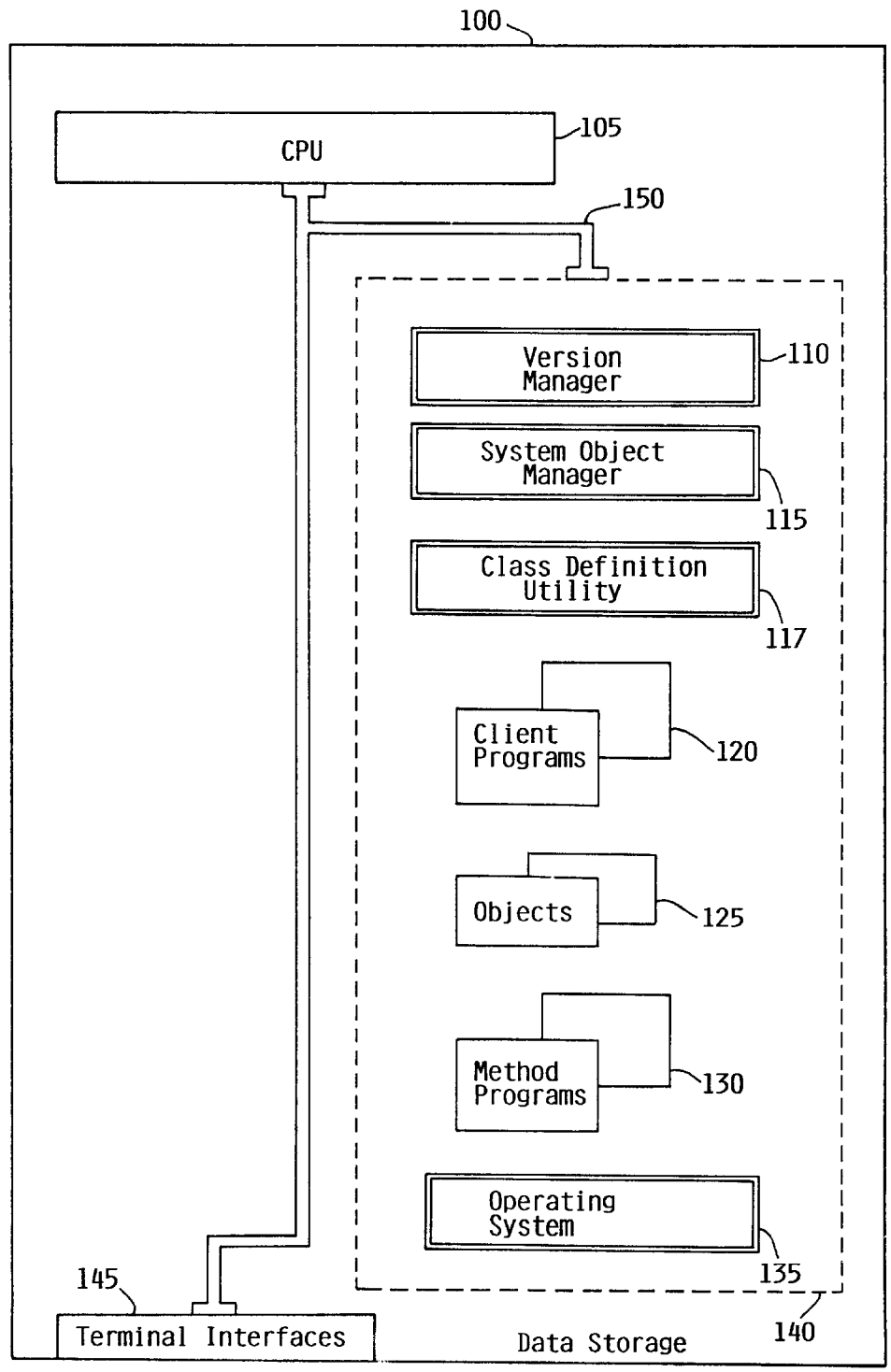
FIG. 1 shows the computer system of the preferred embodiment.

FIG. 1 shows a block diagram of the computer system of the present invention. The computer system of the preferred embodiment is an enhanced IBM AS/400 mid-range computer system. However, any computer system that is capable of supporting an OOP environment could be used. As shown in the exploded view of FIG. 1, computer system 100 comprises main or central processing unit (CPU) 105 connected to data storage 140 and terminal interface 145 via system bus 150. Terminal interface 145 allows system administrators and computer programmers to communicate with computer system 100, normally through programmable workstations. Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bi-directional communication could be used.

Data storage 140 contains version manager 110, system object manager 115, class definition utility 117, client programs 120, objects 125, method programs 130, and operating system 135. While data storage 140 is shown as a monolithic entity, it should be understood that it may comprise a variety of devices, and that all programs and files shown will not necessarily be contained in any one device. For example, portions of client programs 120 and operating system 135 will typically be loaded into primary memory to execute, while source data files will typically be stored on magnetic or optical disk storage devices.

Figure 2:
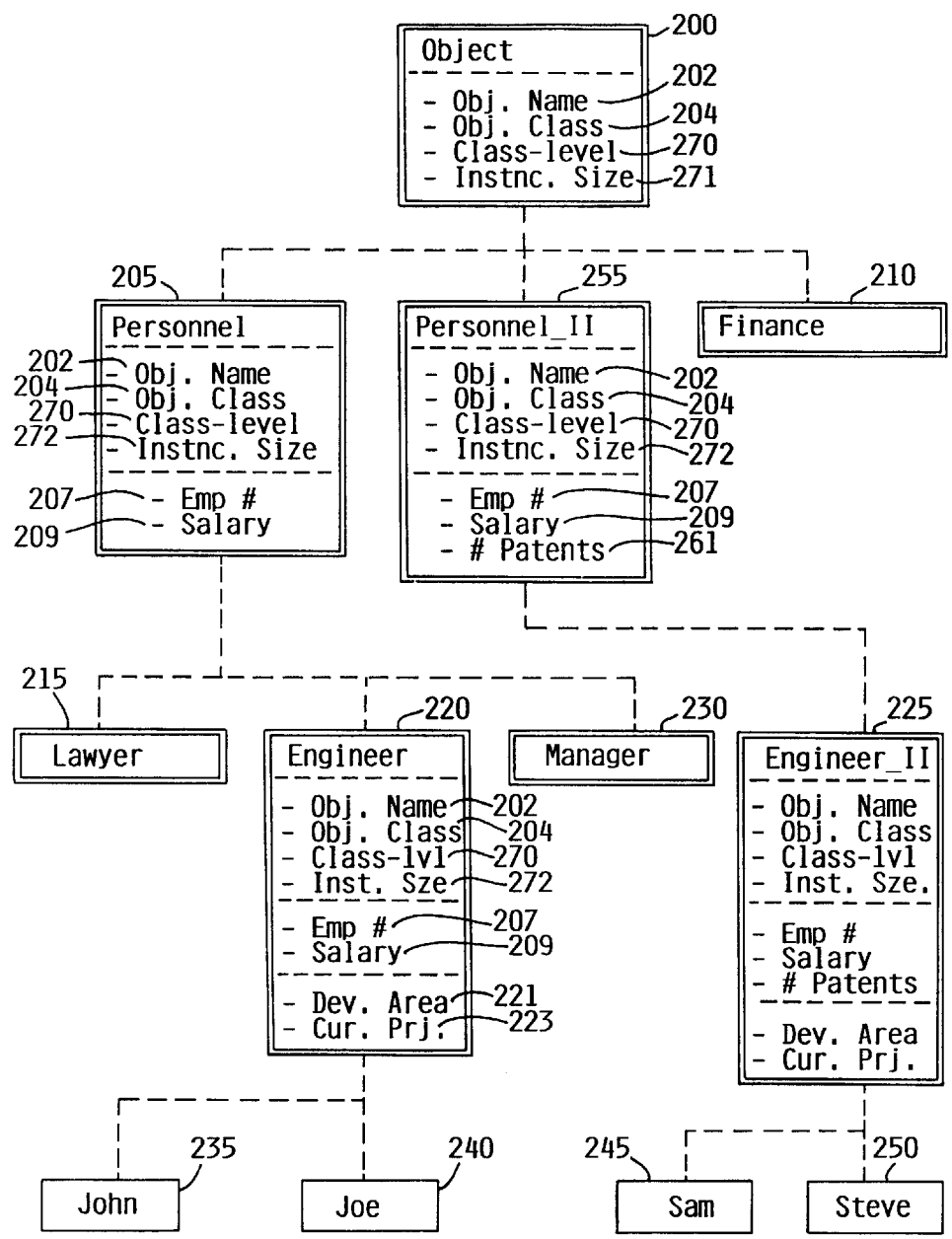
FIG. 2 shows an example OOP hierarchical tree structure that will be used to explain the OOP environment of the present invention.

FIG. 2 shows an example OOP hierarchical tree structure that is used throughout this specification to explain the apparatus, methods, and structure of the present invention. Double lined boxes represent different classes, while single lined boxes represent object instances of a particular class. It should also be understood that FIG. 2 is a conceptual representation of an example OOP hierarchical tree structure. The way in which classes and objects actually exist in data storage 140 is described in FIGS. 4A–4D, 8A, 9A and 10A.

Class "Root" 200 is the base class for the example tree structure. Class Root 200 comprises instance variables: "object name" 202, "object class" 204, "class-level" 270, and "instance size" 272. Since class Root 200 is at the highest level of the tree structure, its instance variables will be inherited by all of the subclasses that are defined below it (not shown for class Finance 210). Class Root 200 should also be considered to be defined at class-level 0. At class-level 1, classes Personnel 205, Personnel_II 255, and Finance 210 have been defined. Class Personnel 205 comprises object instance variables: "object name" 202, "object class" 204, "class-level" 270, "instance size" 272, "employee number" 207 and "salary" 209. Object instance variables "object name" 202, "object class" 204, "class-level" 270, and "instance size" 272 have been inherited from class Root and object instance variables "employee number" 207 and "salary" 209 have been specifically defined for class Personnel. Each class which is defined as a subclass of class Personnel 205 will inherit object instances 207 and 209 (not shown for classes Lawyer 215 and Manager 230).

For example, class Engineer 220 has been defined as a subclass of class Personnel 205. Class Personnel 205 is itself a subclass of class Root 200. Hence, class Engineer 220 will inherit the object instance variable definitions of both of its super classes (i.e., "object name" 202, "object class" 204, "class-level" 270, "instance size" 272, "employee number" 207, and "salary" 209). Class Engineer 220 also contains instance variables that are part of its individual class definition. These are: "development area" 221 and "current project" 223. Any objects that are created as members of class Engineer 220 will have values associated with the object instance variables object name, object class, class-level, instance size, employee number, salary, development area, and current project. John 235 and Joe 240 are examples of objects which are members of class Engineer 220.

Class Personnel_II 255 has also been defined as a subclass of class Root. Class Personnel_II 255 is a newer version of class Personnel 205, and as such, contains most of the same instance variable definitions as class Personnel 205. The exception is instance variable definition "# of Patents" 261. As a new version of class Personnel 205, class Personnel_II 255 will contain the same subclasses as class Personnel 205. Subclass Engineer_II 225 has been shown, while subclasses Lawyer_II and Manager_II have not. As above, class Engineer_II will inherit the object instance variable definitions of both of its super classes (i.e., "object name" 202, "object class" 204, "class-level" 270, "instance size" 272, "employee number" 257, "salary" 259, and "# of Patents" 261). Class Engineer_II 225 will similarly also contain instance variable definitions that are part of its individual class definitions (i.e., "development area" 263 and "current project" 265). Sam 245 and Steve 250 are examples of objects which are members of class Engineer_II 225. The NOM concept of version is explained in more detail in the text accompanying FIGS. 9A and 9B.

The Nom Interface Table

Figure 2B:
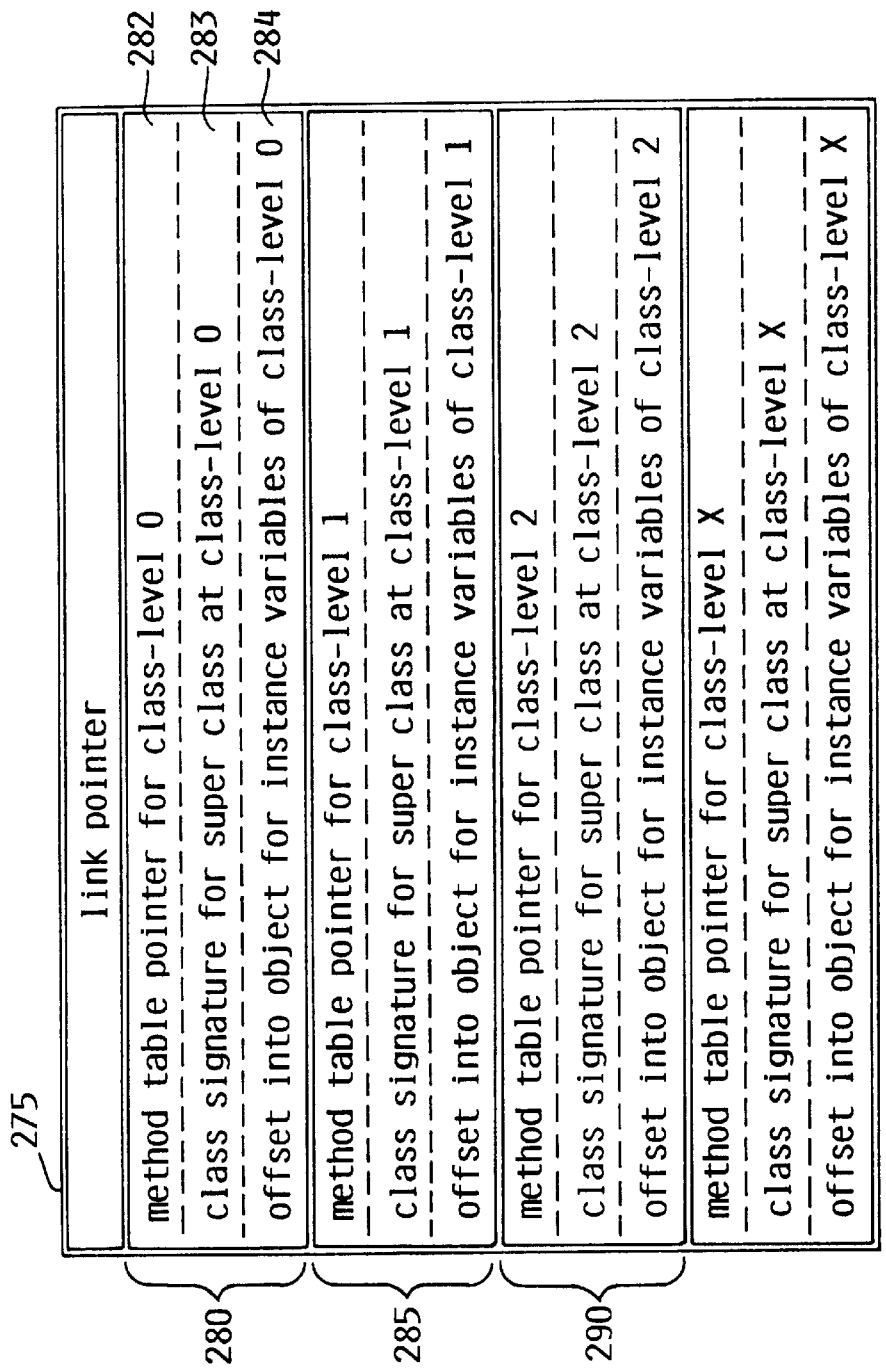
FIG. 2B shows a detailed diagram of the NOM interface table.

Since understanding the NOM interface table is critical to the understanding of the present invention, its details are set out in FIG. 2B. Each entry within an interface table contains information about a particular class in a hierarchy. More specifically, each entry contains location information about the method programs and instance data of a particular class. When method programs route on an object, they gain access to the method programs and instance data by using the location information stored in the interface table.

NOM interface table 275 comprises interface table entries 280, 285, and 290. Each interface table entry is made up of a tuple. The tuple comprises: a method table pointer (e.g., method table pointer 282), a class signature (e.g., class signature 283), and a data offset (e.g., data offset 284). Method table pointers are used by client programs to access particular method tables and eventually method programs. Class signatures are used to ensure that a client program is indeed routing on the correct object class. These fields are explained in more detail in the text accompanying FIGS. 8A and 8B. Data offsets are used by method programs to gain access to the object instance variables stored in the object instance. This field is explained in more detail in the text accompanying FIGS. 9A and 9B.

Creating the NOM Environment

Figures 1, 3A:
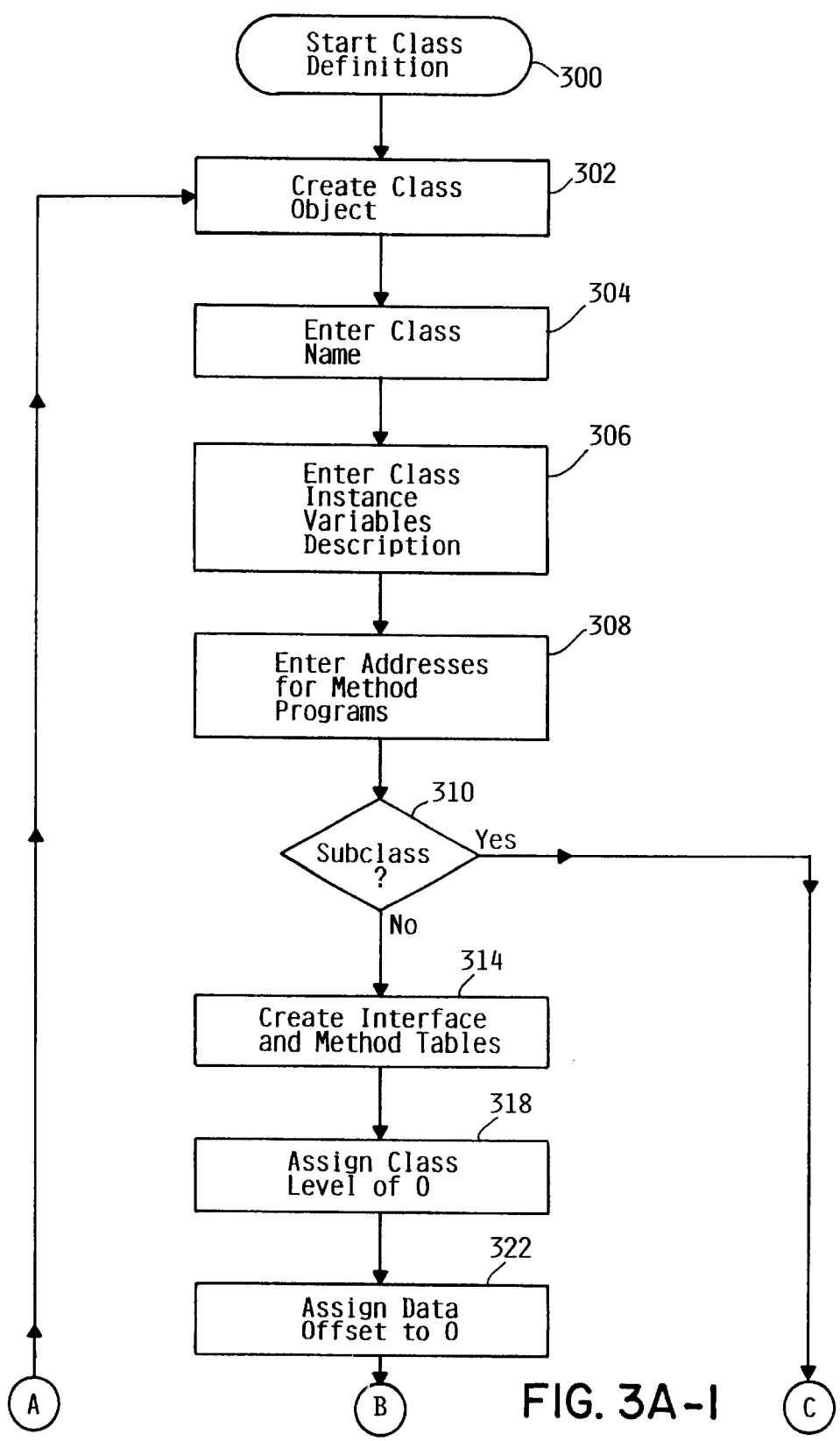
Figures 2, 3A:
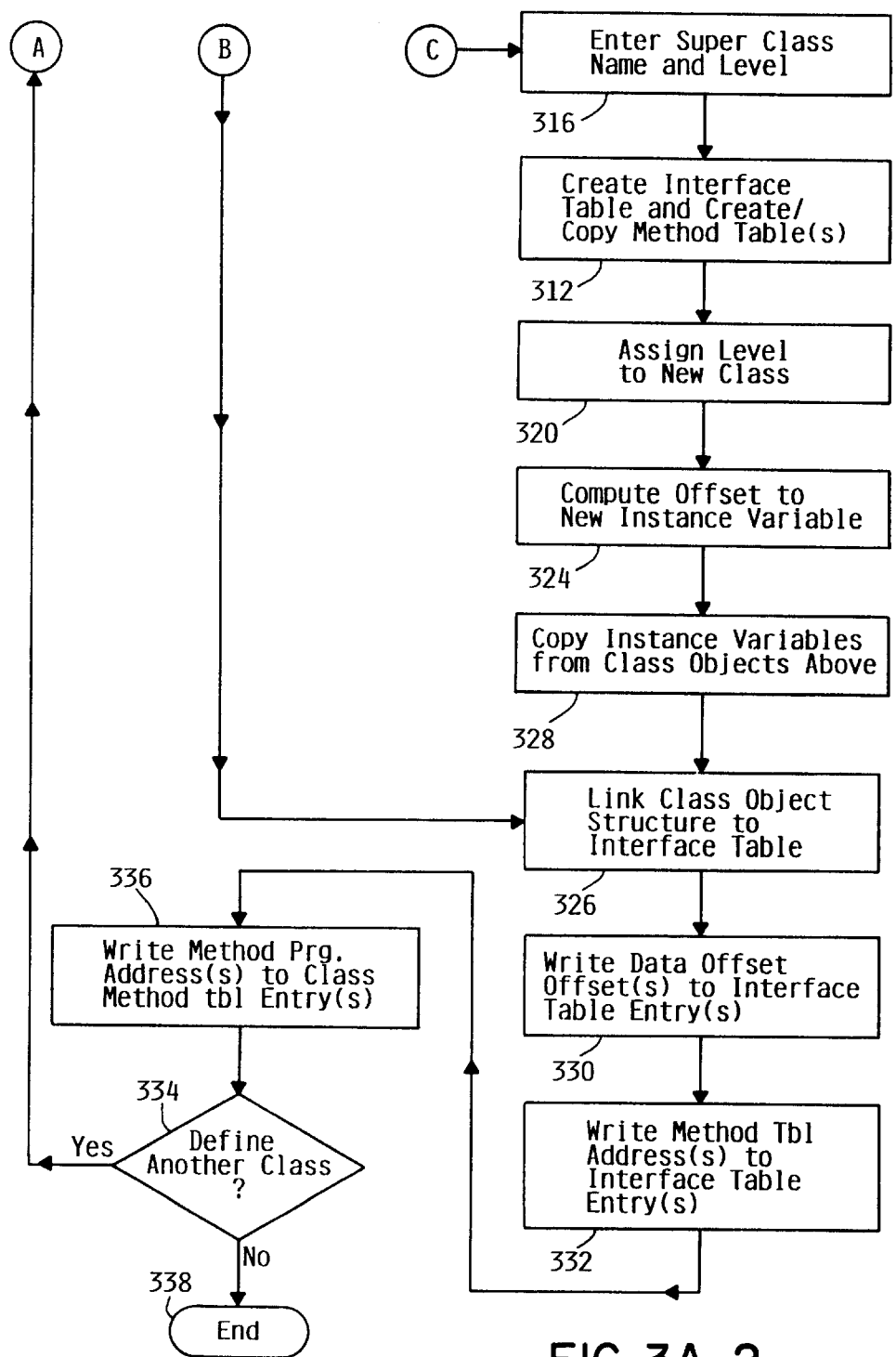
Figure 3B:
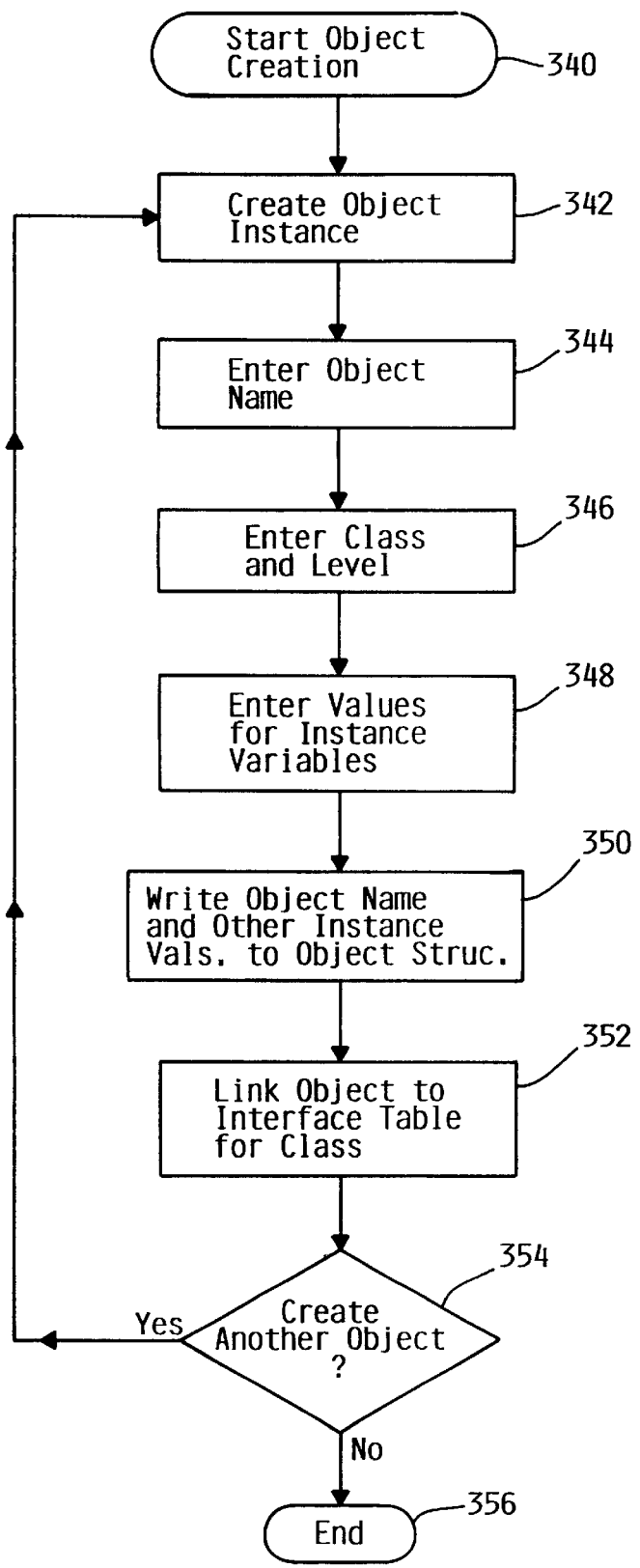

FIGS. 3A-1 and 3A-2 are a flow diagram of the inner workings of class definition utility 117 and FIG. 3B is a flow diagram of the inner workings of system object manager 115. FIGS. 4A through 4D show how a portion of the tree structure of FIG. 2 would actually exist in data storage 140.

FIGS. 3A-1, 3A-2, and 3B are used in conjunction with FIGS. 4A through 4D to explain how a hierarchical configuration such as that shown in FIG. 2 is actually created.

When computer system 100 is shipped to a customer or other user, the composite data structures for class object Root (400 on FIG. 4A) and the Root class (structures 405 and 410 on FIG. 4A) will have already been loaded into data storage 140. It will be understood by those skilled in the art that there is a plethora of ways in which these composite data structures could be initially generated and stored in data storage 140. Similarly, the generation and storage of these structures need not necessarily take place at the factory. A customer or user could also create and store these composite data structures through independent invocation of class definition utility 117 and system object manager 115. For the purposes of this explanation, however, it will be assumed that class object Root 400, interface table 405 (i.e., the interface table for class Root), and method table 410 (i.e., the method table for class Root) have been pre-loaded into data storage 140 at the factory.

When a user of computer system 100 wishes to define class Personnel 205, he or she will initiate a client program (i.e., one of client programs 120) which itself will call (i.e., "route on") class object Root 400. The client program thereby gains access to interface table 405 and method table 410. A complete explanation of how this access is actually performed is provided by FIGS. 8A and 8B and the accompanying text. Once access to method table 410 is accomplished, the client program will invoke class definition utility 117 through the use of define_subclass_p 412. It should be understood that class definition utility 117 is in reality a method program not unlike those of method programs 130. Class definition utility 117 receives increased treatment herein because of the role that it plays in the definition of classes. Flow diagram 3A shows that the first step performed by class definition utility 117 is to create the appropriate class object 302. In this case, the class object created will be class object personnel 415 (shown on FIG. 4B). The user is then asked to enter the class name 304, instance variable definitions for the class (shown at 419 of FIG. 4B) 306, and method program addresses 308.

Class definition utility 117 will then ask the user whether the class to be defined is to be a subclass 310. Since in this example class Personnel is a subclass of class Root, this question will be answered in the affirmative. The user will next be prompted for the name and level of the super class for the class to be defined 316. The name and level must both be specified to ensure that a unique super class is identified. In this example, the super class entered will be Root and the level entered will be zero. Class definition utility 117 then proceeds to create the interface and method tables for class Personnel (block 304) and copy the method table from class Root (block 312). These structures are respectively shown on FIG. 4B as interface table 420 and method tables 425 and 480. The new class (i.e., Personnel) will then be assigned a class-level (1 in this case). In block 324, class definition utility 117 will compute the offset of the instance variable definitions entered by the user in block 306. In block 328, class definition utility 117 will copy the instance variables from class object Root (block 400) and place them into the Personnel class object (block 415). This is shown at 418 of FIG. 4B.

The next step is to link class object 415 to interface table 420 (block 326). This is accomplished by setting interface_tbl_p 417 equal to the starting address of interface table 420. Then, in block 330, class definition utility 117 will write the offsets of the class instance variables into the appropriate interface table entries in interface table 420. The offset for the Personnel class instance variable definitions will be written into the prs_instance_data_o field of interface table entry 423 and the offset for the super class instance variable definitions will be written into the rt_instance_data_o field of interface table entry 421. Lastly, the method table and method program addresses will be written to the interface and method tables respectively. The address for method table 425 will be written to the per_meth_tbl_p field of interface table entry 423 and the address for method table 480 will be written to interface table entry 412 (block 332). In block 336, the addresses for the method programs will next be written into method table 425. For example, the address for a method program called "update salary" will be written into "update_salary_p" field 427.

Figure 4A:
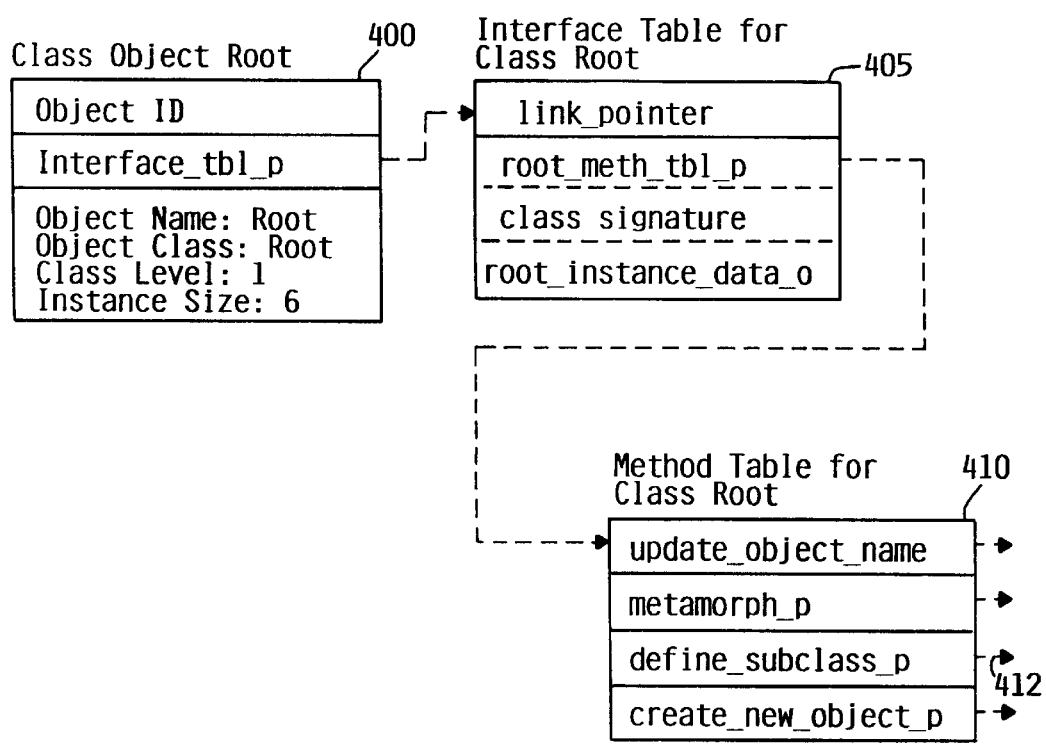
FIGS. 4A through 4D are used in connection with FIGS. 3A-1, 3A-2, and 3B to show how the data structures that make up the NOM environment are actually created and represented in storage.
Figure 4B:
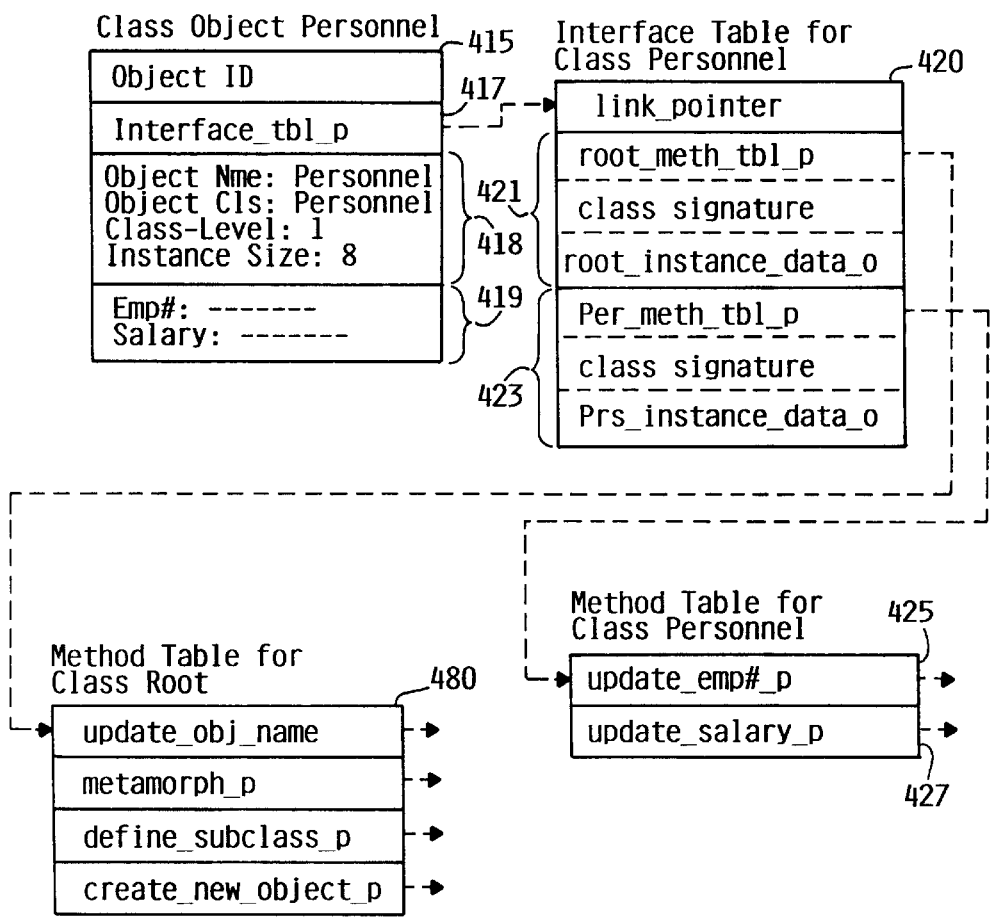
Figure 4C:
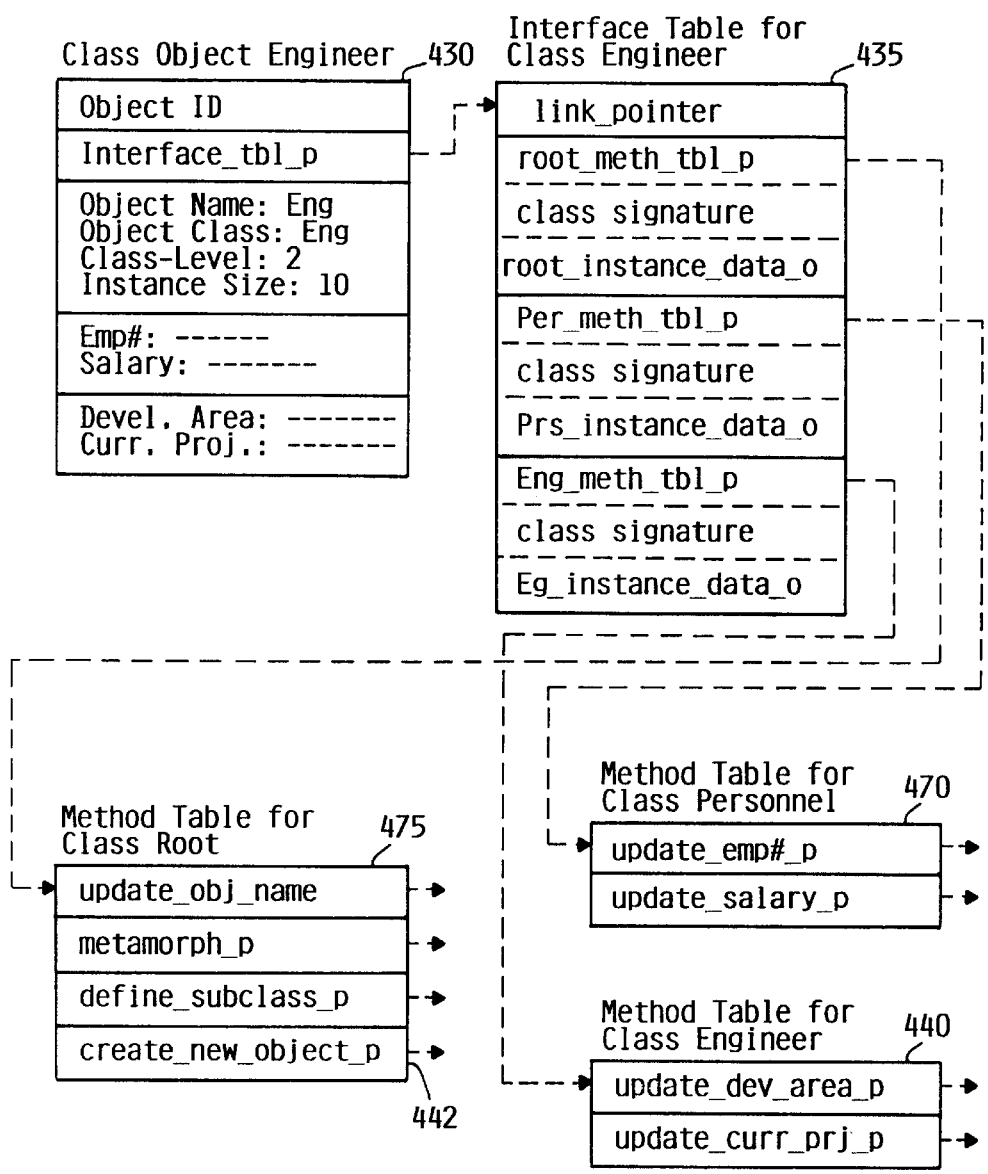
Figure 4D:
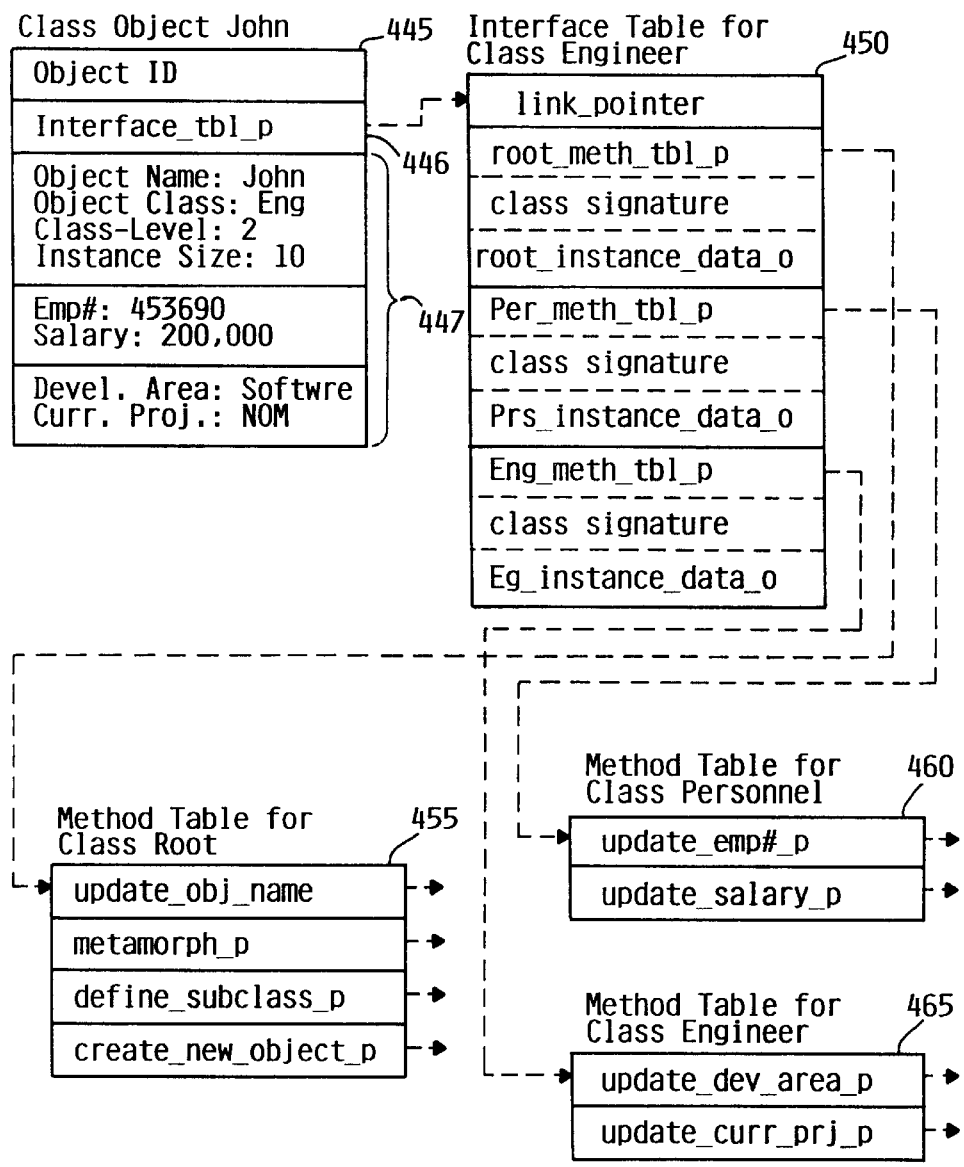

FIGS. 3A-1 and 3A-2, when studied in relation to FIG. 4C, show how the next subclass, Engineer, would be defined. Since the steps taken to define the Engineer subclass are the same as those explained above, their details will not be explored here. At this point, however, it is important to understand some terms that will be used within this specification. As noted above, each class in the NOM environment has a class object. It should also be understood that the interface and method table that have been defined for a particular class will often be referred to as the "class interface table" and the "class method table" respectively. When reference is made to class objects that are not of the same class as the subject class, they will be described as either "super class class objects" or "subclass class objects" depending upon whether they represent a super class of the subject class or a subclass of the subject class. Similarly, reference is made to super class class method and interface tables and subclass class method and interface tables. This should likewise be taken to reference method or interface tables that represent super classes of the subject class or subclasses of the subject class.

The last step in constructing the example hierarchical tree structure of FIG. 2, will be to create object instances that are members of a particular class. Similar to the discussion of the invocation of subclass definition utility 117, a user of computer system 100 that wishes to create an object instance of class Engineer initiates a client program (i.e., one of client programs 120) which routes on class object Engineer 430. The client program will thereby gain access to interface table 435 and method table 475 (i.e., the method table copied from class Root). A complete explanation of how this access is actually performed is provided by FIGS. 8A and 8B and the accompanying text. Once access to method table 475 is accomplished, the client program will invoke system object manager 115 through the use of create_new_object_p 442.

FIG. 3B is a flow diagram of the inner workings of system object manager 115. System object manager 115 will first create an object 342. In this example, object instance 445 (John) will be created (shown on FIG. 4D). The user will next be prompted to enter the object name 344, class and level 346, and values for the object instance variables 348. The values are shown at 447 on FIG. 4D. System object manager 115 will then write this information into object 445 (block 350). Object 445 will then be linked to interface table 450 (i.e., the interface table for class Engineer) via interface_tbl_p 446 (block 352). Client programs that wish to manipulate the data associated with the engineer "John" may now call the object instance John to do so.

The Shortcomings of C++

Figure 5:
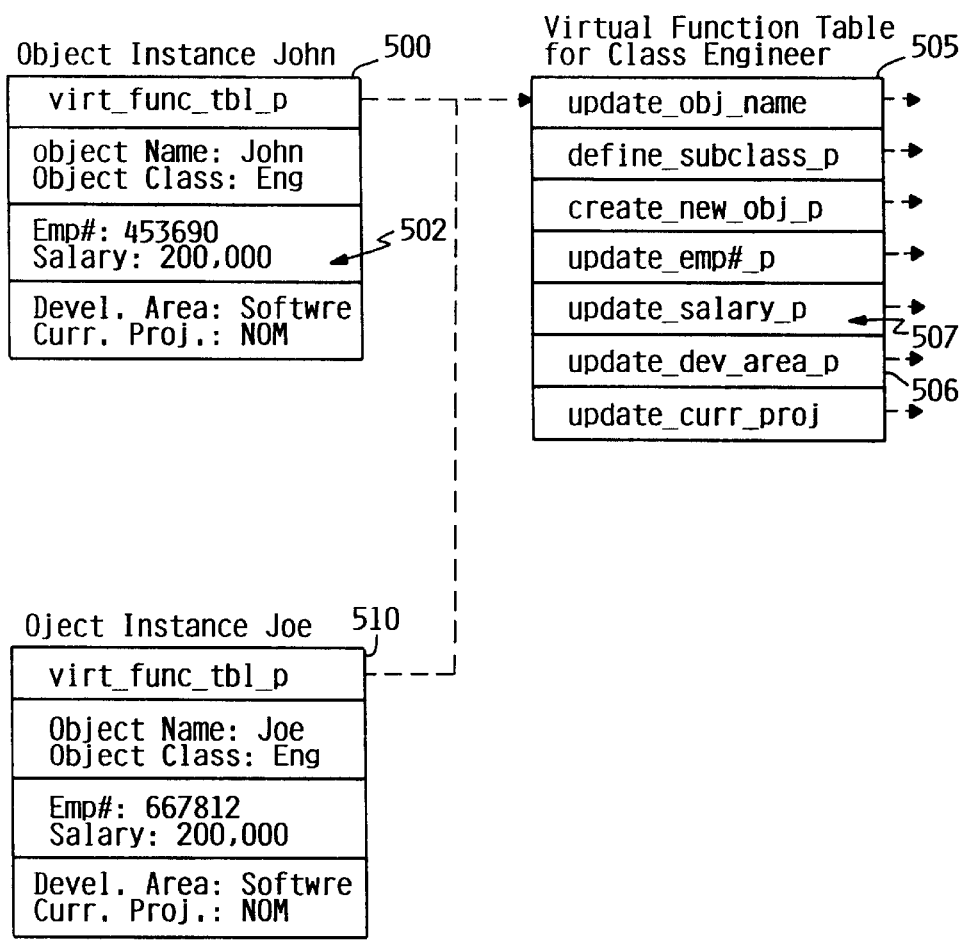
FIG. 5 shows how an example object instance would be represented in the C++ OOP environment.

FIG. 5 shows the primary composite data structures that are the basis for the C++ OOP environment. Object instances 500 and 510 are representative of how the object instances for engineers John and Joe would be exist in a C++ environment. Virtual function table 505 contains method pointers to the method programs for the class to which object instances John and Joe are members (i.e., Engineer) and all the super classes to which class Engineer is a subclass (i.e., super classes Personnel and Root).

As mentioned in the Background section, the C++ environment is extremely rigid when it becomes necessary to add method programs and/or data to a particular class. Whenever data for a particular class of objects requires a change or whenever a method for a particular class of objects is to be added, all of the objects that are members of the changed class and all of the objects that are members of a subclass of the changed class must be recreated and their method programs must be recompiled. Further all the clients of those objects, must also be recompiled. The reason for this rigidity is stems from the design of the C++ data structures.

Addition of a New Method Program to a C++ Class

When a client program in a C++ environment routes on an object, it specifies, as part of its call statement, the offset of the entry in the virtual function table that represents the method program that is to be invoked. As shown in FIG. 5, the pointers to the method programs for the entire hierarchy are stacked in virtual function table 505. When it becomes necessary to add a method program to a particular class, the method program pointers for the method programs of subclasses of the particular class are all shifted down in the structure (i.e., their offsets change). For example, to add a method program to the class Personnel, an address of the method program would be inserted at 507. The pointer to the new method program would then be located at the offset that was formerly occupied by the pointer to the "update development area" method program (i.e., update_dev_area_p 506). The pointer to the "update development area" method program is, in turn, shifted down into the location formerly occupied by the pointer to the "update current project" pointer, and so on.

The effect of this "shifting" is that all the client programs that route on objects of class Personnel would require recompilation (i.e., to understand the existence of the new method) and all the client programs for subclasses of class Personnel (i.e., Engineer) would require recompilation to understand the new offsets of the old method programs.

Addition of a New Instance Variable Definition to a C++ Class

The C++ OOP environment has a similar problem when it becomes necessary to a new instance variable definition to a particular class. For example, if a new instance variable definition were required for the class Personnel (e.g. "number of patents"), it would need to be inserted into object instance John at 502. This would require all of the method programs that access Engineer instance data to be recompiled since without such recompilation, those methods would access the last field of the Personnel class instance data (i.e., the new number of patents field) when access of the first field of the Engineer class instance data (i.e., the development area field) was intended. Further, since recompilation of those methods renders them useless for operation upon objects of class Engineer which have not yet been changed (e.g., object instance Joe), all objects of class Engineer, and all objects that are members of subclasses of class Engineer must also be recreated.

In addition, all client programs are required to know the object length for objects that they wish to call. This stems from the fact that C++ objects are created at runtime. Hence, since the addition of the new instance variable "number of patents" has changed the size of the object instances of class Engineer, and any subclasses of Engineer, client programs which create object instances must also be recompiled.

In many cases, it is easier to simply recompile the entire code base than to attempt to determine which objects and client programs have been effected by a particular change to instance data of a particular class of objects. Recompilation of this type may take up to twenty four hours to complete.

The Shortcomings of Smalltalk

Figure 6A:
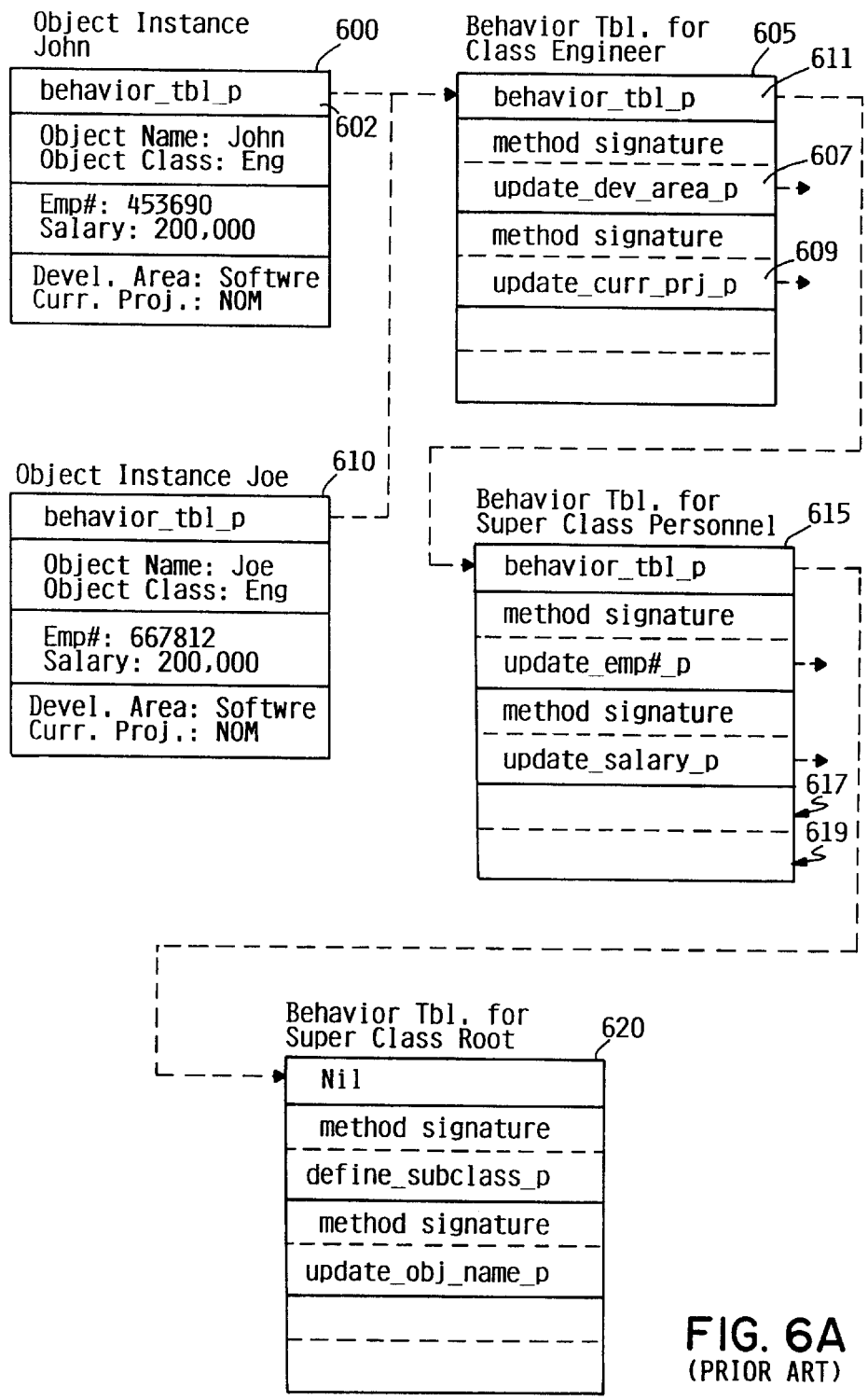
FIG. 6A shows how an example object instance would be represented in the Smalltalk OOP environment.

FIG. 6A shows the primary composite data structures that are the basis for the Smalltalk OOP environment. Object instances 600 and 610 are representative of how the object instances for engineers John and Joe would be exist in a Smalltalk environment. Unlike the C++ environment, the Smalltalk OOP environment comprises a behavior table for each class within a hierarchy. These are shown on FIG. 6A as: behavior table 605 for class Engineer, behavior table 615 for super class Personnel, and behavior table 620 for super class Root.

Addition of a Method Program to a Smalltalk Class

This design difference provides the users of a Smalltalk OOP environment with an advantage over the users of a C++ OOP environment. The users of the Smalltalk OOP environment do not need to recompile the entire code base to add a method program to a particular class. Unlike the C++ call statement, the Smalltalk call statement simply provides a call-signature that is used to identify one of the method program pointers in one of the behavior tables. To illustrate, once again assume that a user wishes to add a method program to class Personnel. The pointer to the method program and the signature for the method program would be added to the behavior table for super class Personnel (i.e., behavior table 615) at 617 and 619 respectively. Unlike in the C++ environment, there is no shifting involved. As shown, the pointers to the method programs for class engineer (i.e., update_dev_area_p 607 and update_curr_prj_p 609) are not be displaced. Hence, no recompilation of the client programs that use the objects of class Engineer is required. Only those client programs which need to gain access to the new method program will need to be recompiled.

Inefficient Method Program Access

Figure 6B:
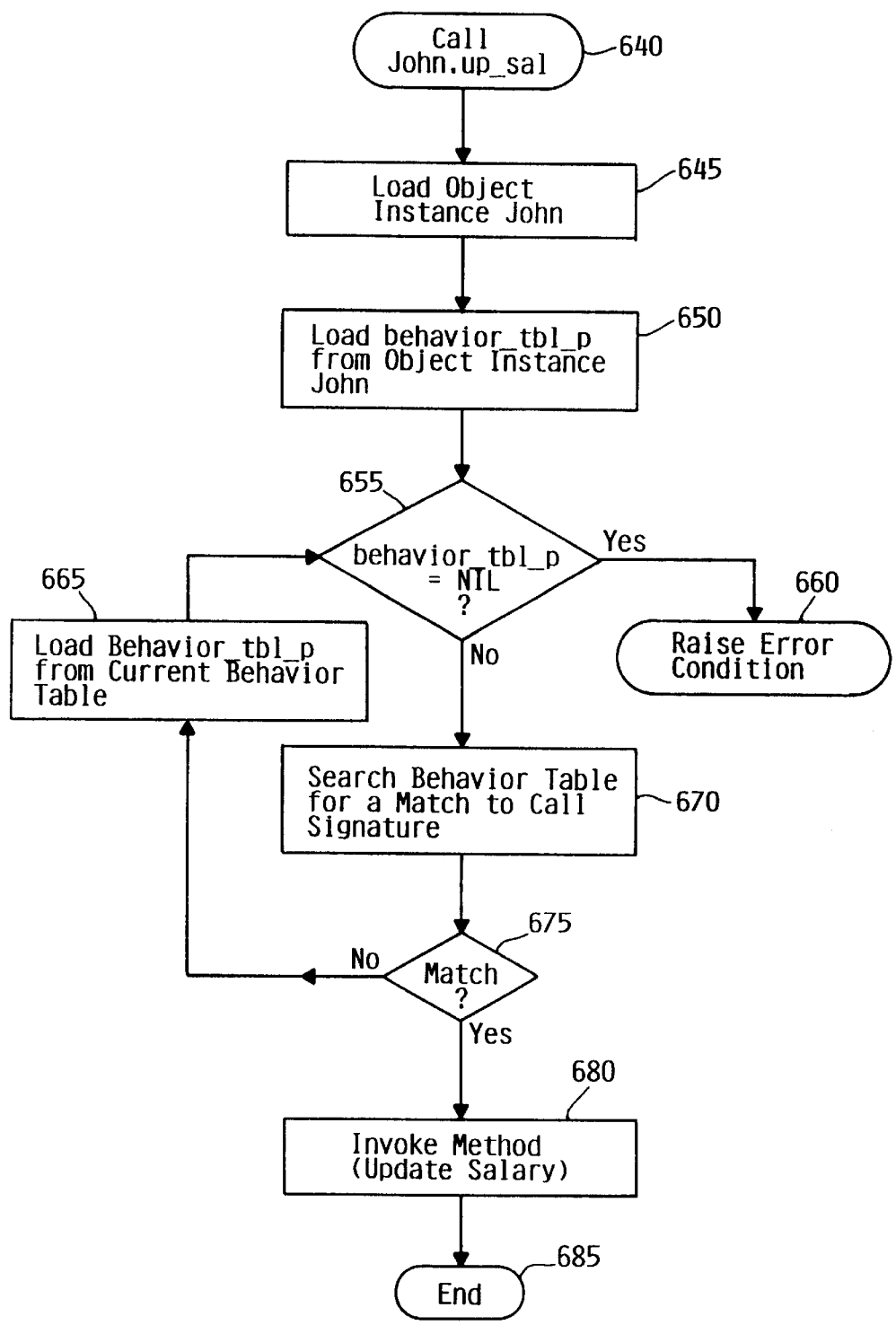
FIG. 6B shows the method routing technique used in the Smalltalk OOP environment.

However, the runtime cost associated with this advantage is significant. FIG. 6B shows how a method program that is called by a client program is actually located. Assume that a client program wishes to update the salary of engineer John. The client program would have as part of its code a call statement ("John.update_salary" 640) that allowed it to route on the object John. The client program's code would then load the object instance John 645 (object instance 600 on FIG. 6A), load the behavior table pointer from the object John 650 (behavior_tbl_p 602 on FIG. 6A), and check to determine whether the behavior table pointer was Nil 655. On the first pass, the pointer will not be Nil so the client program will search the behavior table pointed to by the pointer (i.e., the behavior table for class Engineer) for a method signature that matches the call-signature. Since the pointer to the method program "update salary" is not contained in behavior table 605, the client program proceeds to load the behavior table pointer contained in the current behavior table (i.e., behavior_tbl_p 611) (in block 665) and determine whether it is Nil 655. The behavior table pointer is once again not Nil so the client program proceeds to search the next behavior table (i.e., behavior table 615) for a match of the call-signature to a method signature 670. A match is finally found 675 and the method program is invoked 680. As is known by those skilled in the art, these table accesses and searches are extremely runtime intensive. It is also important to note that as the number of levels are increased the greater the cost of invoking higher level method programs. Further, overall system performance is difficult to predict since the overhead associated with calling method program varies by level.

Addition of a New Instance Variable Definition to a Smalltalk Class

Figure 7:
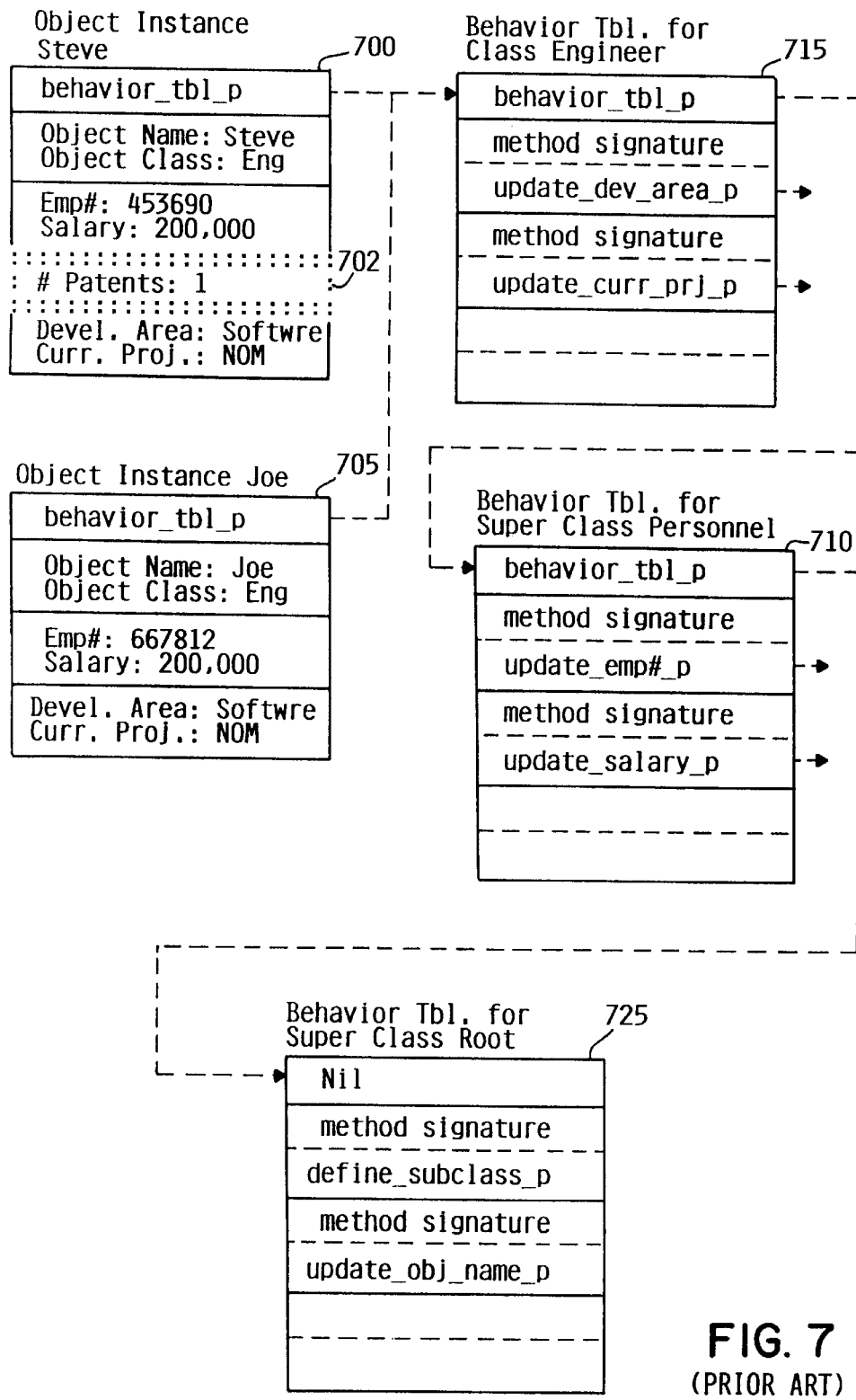
FIG. 7 shows the effect of adding an object instance data definition to an example object instance of the Smalltalk OOP environment.

While the Smalltalk environment is superior to the C++ OOP environment in that a method program can be added to a class without a significant amount of recompilation, the Smalltalk OOP environment does share the instance data addition problem of C++. FIG. 7 will be used to illustrate this problem. If, as above, a user wishes to add the instance variable definition "number of patents" to the class to which object Steve is a member (i.e., Engineer), it would need to be inserted into object instance Steve at 702. This would require all of the method programs that access Engineer instance data to be recompiled since without such recompilation, those methods would access the last field of the Personnel class instance data (i.e., the new number of patents field) when access of the first field of the Engineer class instance data (i.e., the development area field) was intended. Further, since recompilation of those methods renders them useless for operation upon objects of class Engineer which have not yet been changed (e.g., object instance Joe 705), all objects of class Engineer, and all objects that are members of subclasses of class Engineer must also be recreated.

As with the C++ environment, it may simply be easier to recompile the entire code base and recreate all the objects than it would be to attempt to determine which objects and client programs have been effected by a particular change to instance data of a particular class of objects. As mentioned, a recompilation of this type may take many hours to complete.

The Advantages of the NOM OOP Environment

Figure 8A:
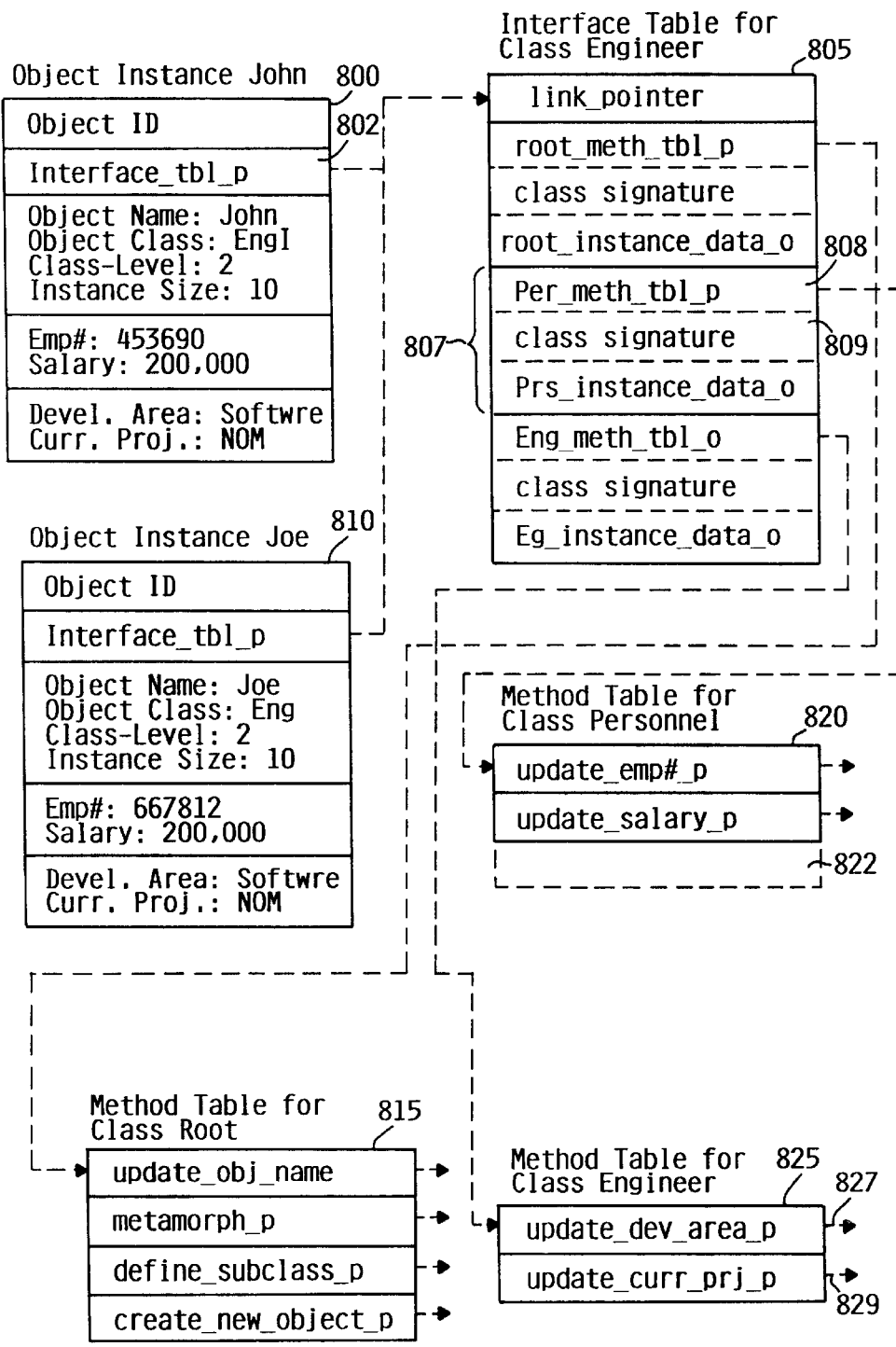
FIG. 8A shows how an example object instance would be represented in the NOM environment.

FIG. 8A shows the primary composite data structures of the present invention. Object instances 800 and 810 are representative of how the object instances for engineers John and Joe will exist in the NOM environment. Unlike the C++ and Smalltalk environments, the NOM OOP environment comprises an interface table for class Engineer (i.e., interface table 805), and method tables for each class within a hierarchy. These are shown on FIG. 8A as: interface table 805 and method table 825 for class Engineer, method table 820 for super class Personnel, and method table 815 for super class Root.

These differences provide the users of a NOM OOP environment with advantages which are not realized by the users of the C++ and Smalltalk OOP environments. Like the users of the Smalltalk OOP environment, the users of the NOM environment do not need to recompile the entire code base to add a method program to a particular class. However, the NOM environment allows for far more efficient method resolution than does the Smalltalk environment. Moreover, the NOM environment does not share the instance data definition shortcomings of the C++ and Smalltalk environments.

Addition of a Method Program to a NOM Class

To illustrate the addition of a method program to a NOM class, assume that as above a user wishes to add a method program to class Personnel. The pointer to the method program would be added to the method table for class Personnel (i.e., method table 820) at 822. As with the Smalltalk environment, and unlike that of C++, there is no shifting involved, the pointer to the method programs for class engineer (i.e., update_dev_area_p 827 and update_curr_prj_p 829) would not be displaced. Hence, client programs that use objects of class Engineer would not require recompilation. Only those client programs which need to gain access to the new method program will need to be recompiled.

Efficient Method Program Access

Figure 8B:
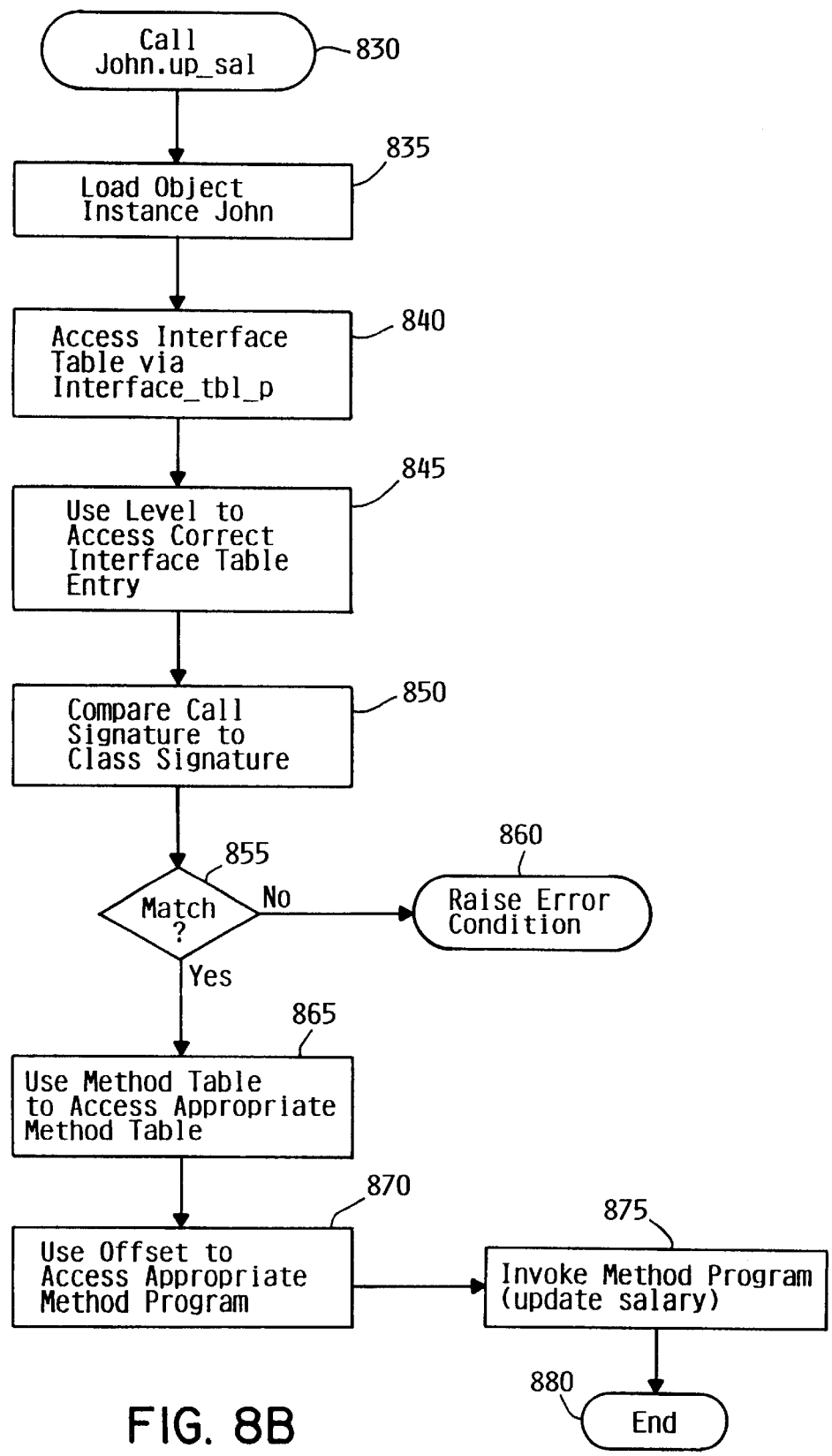
FIG. 8B shows the method routing technique used in the NOM OOP environment.

FIG. 8B shows how a method program of the NOM environment is located when called by a client program. Using the same example, assume that a client program wishes to update the salary of engineer John. The client program would have as part of its code a call statement ("John.update_salary" 830) that allowed it to route on the object John. When compiled, a NOM call statement comprises: an object ID, a class-level, a class-signature, and a method offset. After executing the call statement, the client program code would load the object instance John (object instance 800 on FIG. 8A) 835, load the interface table pointer from the object John (interface_tbl_p 802 on FIG. 8A) 840, use the class-level to access the correct interface table entry (i.e., interface table entry 807 as specified by class-level 1), and compare the call-signature with the class-signature (i.e., class-signature 809) stored in interface table entry 807 (block 850). The call and class signatures of the preferred embodiment are constructed using the subject computer system's identification number, the class-level, and a time stamp; however, any means for producing a unique identifier could be used. Since in this example, the client program did want to gain access to the "update salary" method program associated with class Personnel, the signatures would match 855.

In block 865, the client program uses Per_meth_tbl_p 808 to gain access to method table 820 (i.e., the method table for class Personnel) and the method offset to access 870 and invokes 875 the "update salary" method program. NOM method resolution also requires that the client program pass the method program the object ID, a pointer to the interface table, and the class-level. The use of this information will be explained in the text accompanying FIGS. 9A and 9B.

It should be noted from the above that the method program access of NOM is far more efficient than that of Smalltalk. The method program access of NOM requires a fixed number of table lookups (i.e., two) and an invocation, while the method program access of Smalltalk involves an expensive series of table accesses and searches. Note that while it is true that each search of the Smalltalk method route could be made faster by using a hash based search, any hash function would require at least as many instructions as the entire NOM method route. Of course, then, method resolution for method program pointers that are not found in the first behavior table would take much longer.

Addition of a New Instance Variable Definition to a NOM Class

As stated above, the NOM OOP environment is superior to that of C++ and Smalltalk in that it does not require a massive recompile whenever a new instance variable definition is required. The NOM composite data structures provide this capability by allowing for different versions of objects to co-exist and by providing the ability to change an object from an old version to a new version.

Assume for the purposes of this explanation that company XYZ, the company that employs engineers John and Steve, has recently introduced a invention award program, and therefore, needs to track the number of patents produced by each employee. To this end, company XYZ defines a new version of subclass Personnel, called subclass Personnel_II (i.e., shown as class Personnel_II 255 on FIG. 2). The definition of the new version of class Personnel (i.e., Personnel_II) also results in a new version of all of the subclasses of class Personnel (i.e., Engineer_II, Lawyer_II, and Manager_II). Engineer Sam has just joined the company, and already has two patents, so company XYZ simply creates an object instance of the new type for him (i.e., object instance Sam is created as a member of class Engineer_II). Engineers John and Joe have not yet produced a patent so company XYZ sees no immediate need to change the object instances that represent them from the old version (i.e., Engineer) to the new version (i.e., Engineer_II). Accordingly, company XYZ chooses to leave object instances John and Joe at a "back-level."

NOM Versions

Figures 1, 9A:
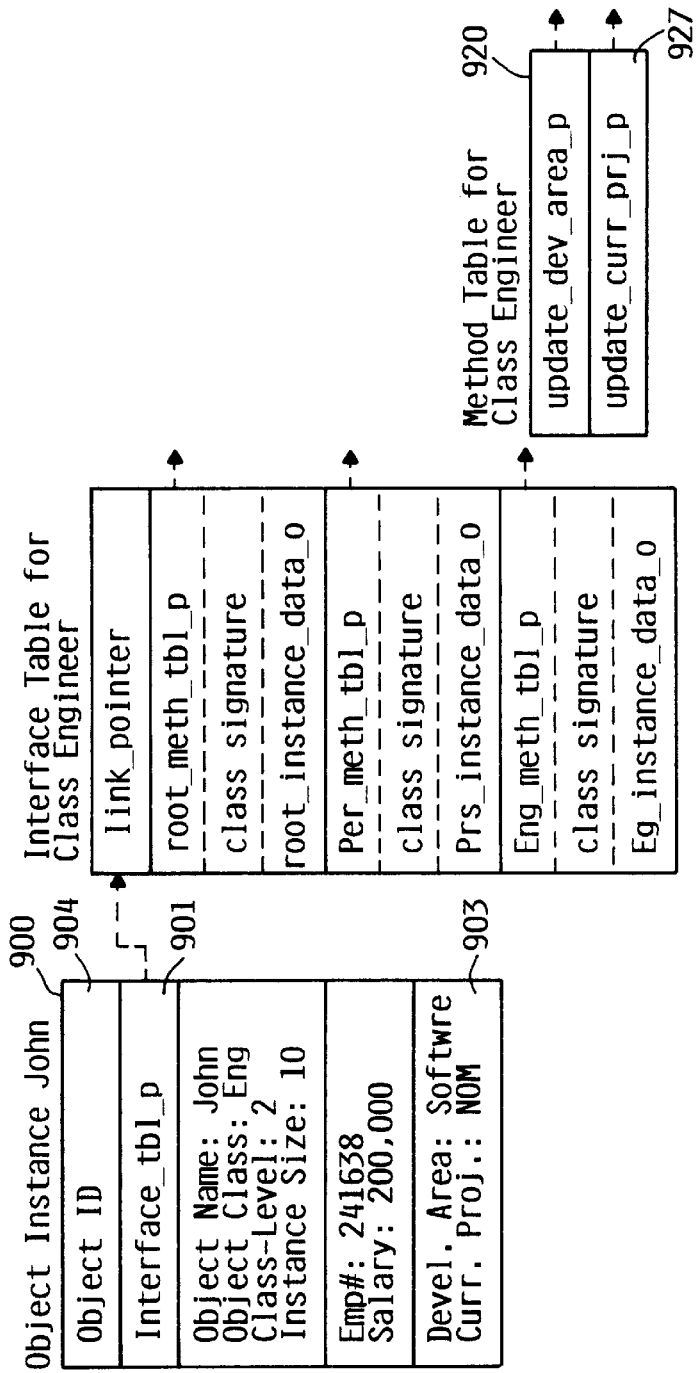
FIGS. 9A and 9B show how the addition of an object instance data definition is handled in the NOM OOP environment.
Figures 2, 9A:
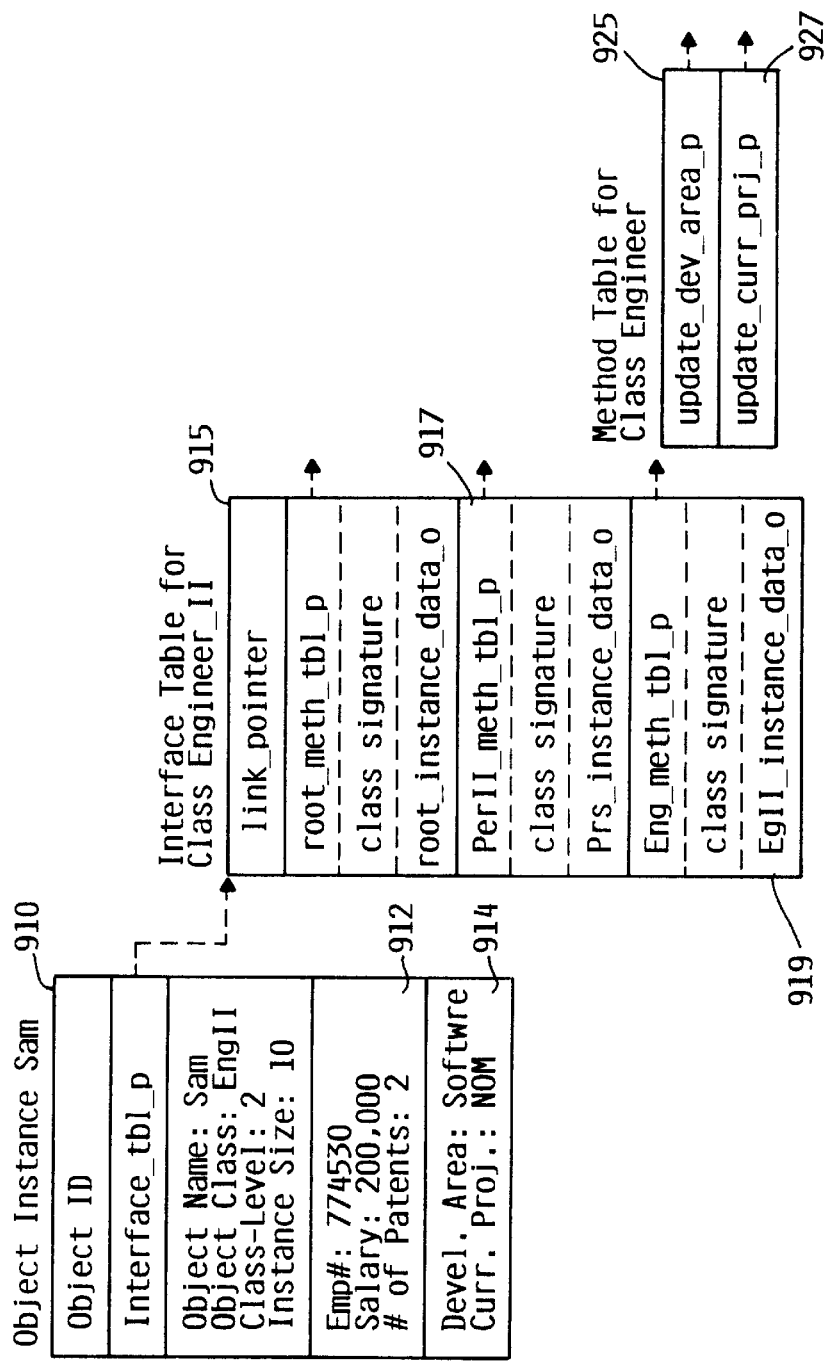

FIG. 9A shows how object instances for the two versions of the Engineer class (i.e., Engineer and Engineer_II) would co-exist in the NOM environment. During the course of this explanation, occasional reference to FIG. 2 should be made to better understand the context of the discussion. Object instance John 900 is a member of class Engineer, while object instance Sam 910 is a member of the new version of class Engineer (i.e., Engineer_II). To allow versions of objects to co-exist, each version has its own interface table (shown on FIG. 9A as interface tables 905 and 915). The way in which versions are created is explained in detail in the text accompanying FIG. 9B. Close examination of the these two interface tables reveals that the only fields that differ between the two interface table versions are: PerII_meth_tbl_p 917 and EgII_instance_data_o field 919. PerII_meth_tbl_p 917 differs from that of class Engineer to allow method programs to utilize the new object instance variable for class Personnel_II (i.e., "# of patents" 912). EgII_instance_data_o 919 is different because the addition of instance variable 912 has displaced the object instance data associated with class Engineer_II.

The benefits associated with the minimal nature of the these differences is best explained by way of example. As stated above, the object instances for engineers John and Sam are of different version because Sam has two patents and John has yet to produce a patent. Nevertheless, this difference should not effect client or method programs that deal with other instance variables. An example of this is the need to change the values in "current project" fields 903 and 914. The addition of the "# of patents" field 912 should not cause a recompilation of method programs that deal only with "current project" fields 903 and 914. Indeed, unlike in the C++ and Smalltalk environments, such a recompilation is unnecessary in the NOM environment.

To illustrate, assume that the NOM project has been completed and it is time for engineers Sam and John to move on to another project. Since the NOM patent has not yet been allowed, John is yet to produce a patent and there is, therefore, no need to change the version of his object instance from Engineer to Engineer_II. Nevertheless, it is necessary to change the value of the "current project" field 903 and "current project" field 914 to reflect that engineers John and Sam are moving on to different projects. Accordingly, a user who is responsible for changing object instances to reflect movement to new projects initiates a client program to perform the change. The client program will first route on object John to update "current project" field 903. The client program will eventually invoke an "update current project" method program via update_curr_prj_p pointer 927 in method table 920. It is important to note that while each version will have a copy of the method table for class Engineer (i.e., method tables 920 and 925), the pointers stored therein will point to the same method programs (i.e., the same executable code).

NOM method resolution was fully explained earlier in connection with FIGS. 8A and 8B and will not be reiterated here; however, as stated in that discussion, NOM method programs are passed a pointer to the interface table (i.e., interface_tbl_p 901), the class-level for which they have been invoked, and the object ID (i.e. object ID 904). In this case, the "update current project" method program will use this information to gain access to the offset stored in Eg_instance_data_o field 907. This information when used with object ID 904 allows the method program to make the appropriate change to current project field 903.

From the client and method program perspective the same change to object Sam 910 (i.e., to update current project field 914), is processed in the same manner. The "update current project" method program is once again invoked and it once again gains access to the "current project" field (i.e., in this case current project field 914) via the appropriate interface table pointer, class-level, object ID, and instance data offset. The fact that these fields have different values than those used to update the same field in object 900 is, of course, of no consequence to the method program. Indeed, these differences are expected. Hence, through "versioning", the addition of the "number of patents" instance data definition was added to certain object instances without the need to recompile object instances, client programs, and method programs which were not directly effected by the change.

Figure 9B:
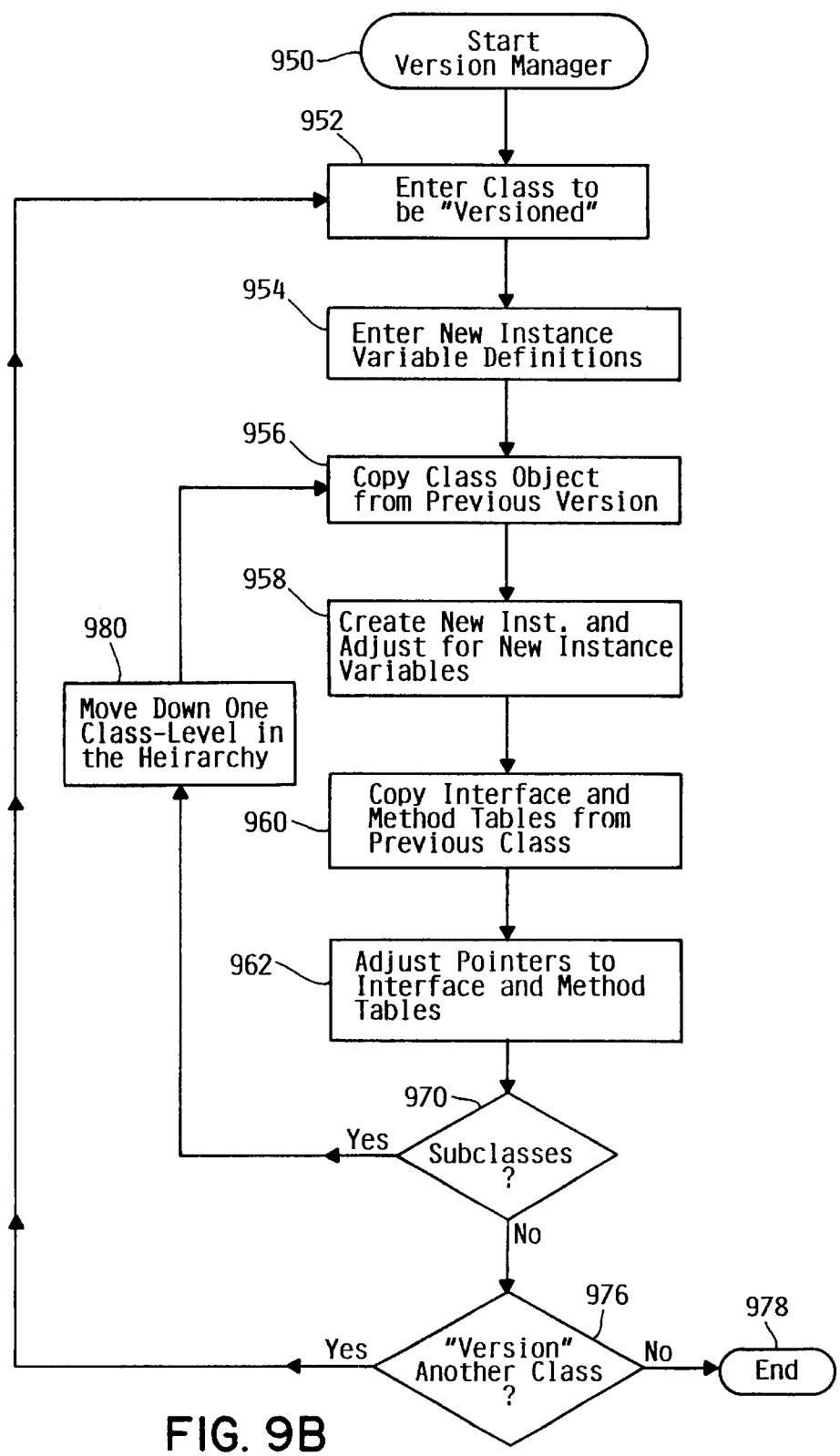

FIG. 9B shows the method used in the NOM environment to produce different versions of object instances. A user who wishes to create a new version will invoke version manager 110 at block 950. Version manager 110 will respond by prompting the user for the class that is to be "versioned." 952. The user will next be prompted for entry of the new instance variable definitions 954. Version manager 110 will then copy the class object from the previous version 956, create the new class object and adjust for the new instance variable definitions 958. Version manager 110 will then copy the interface tables from the previous version 960 and adjust the pointers to properly link the class object to the interface table and the interface table to the appropriate method table or tables 962. Version manager 110 next determines whether there are subclasses to be "versioned" 970. If there are, version manger goes down one level 980 and continues processing at block 956. If there are no subclasses to be "versioned" 970 and the user does not wish to "version" another class 976, processing ends 978.

NOM Metamorphosis

Figure 10A:
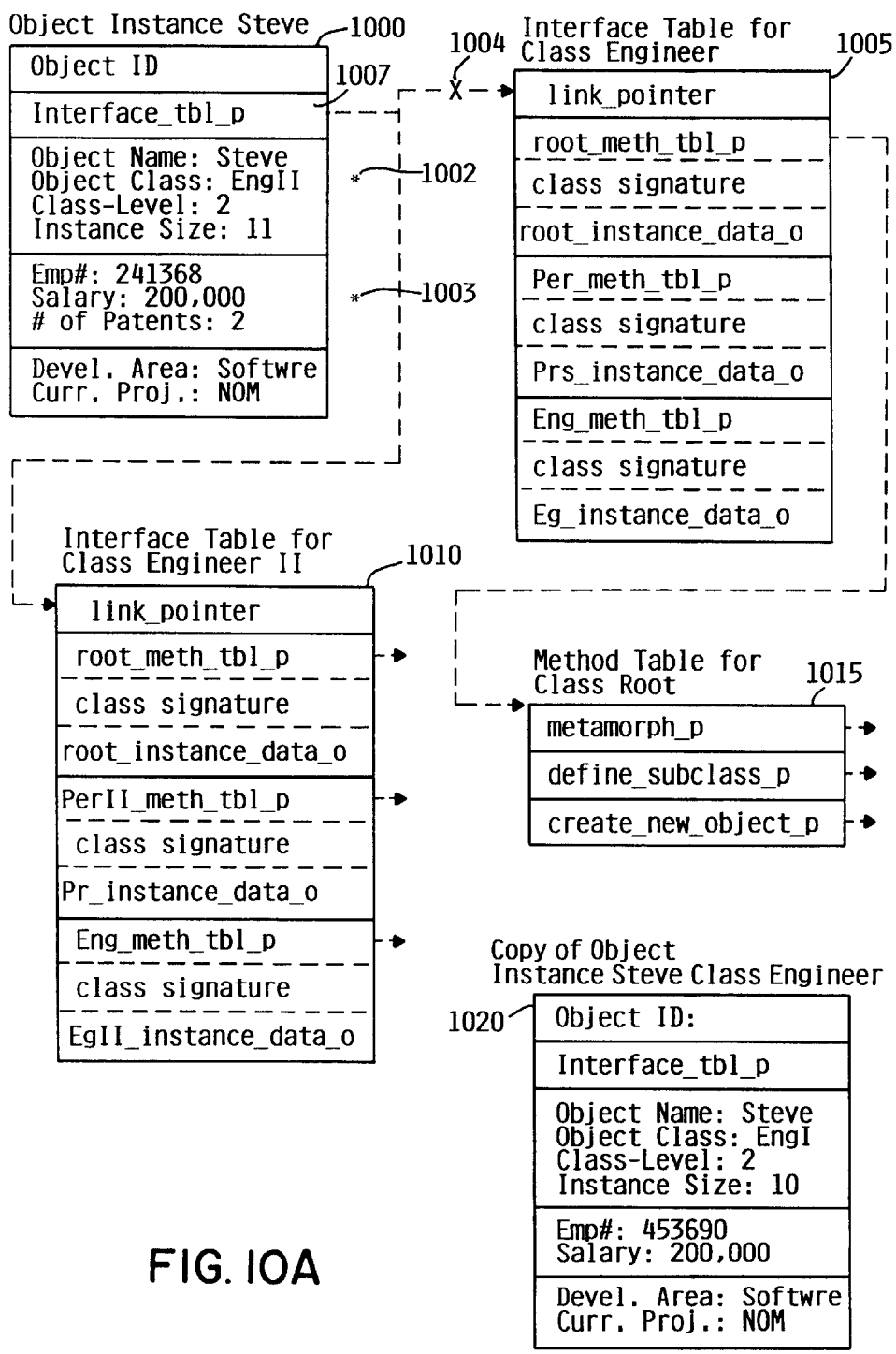
FIGS. 10A and 10B show how the objects of NOM are converted from one version to another.
Figure 10B:
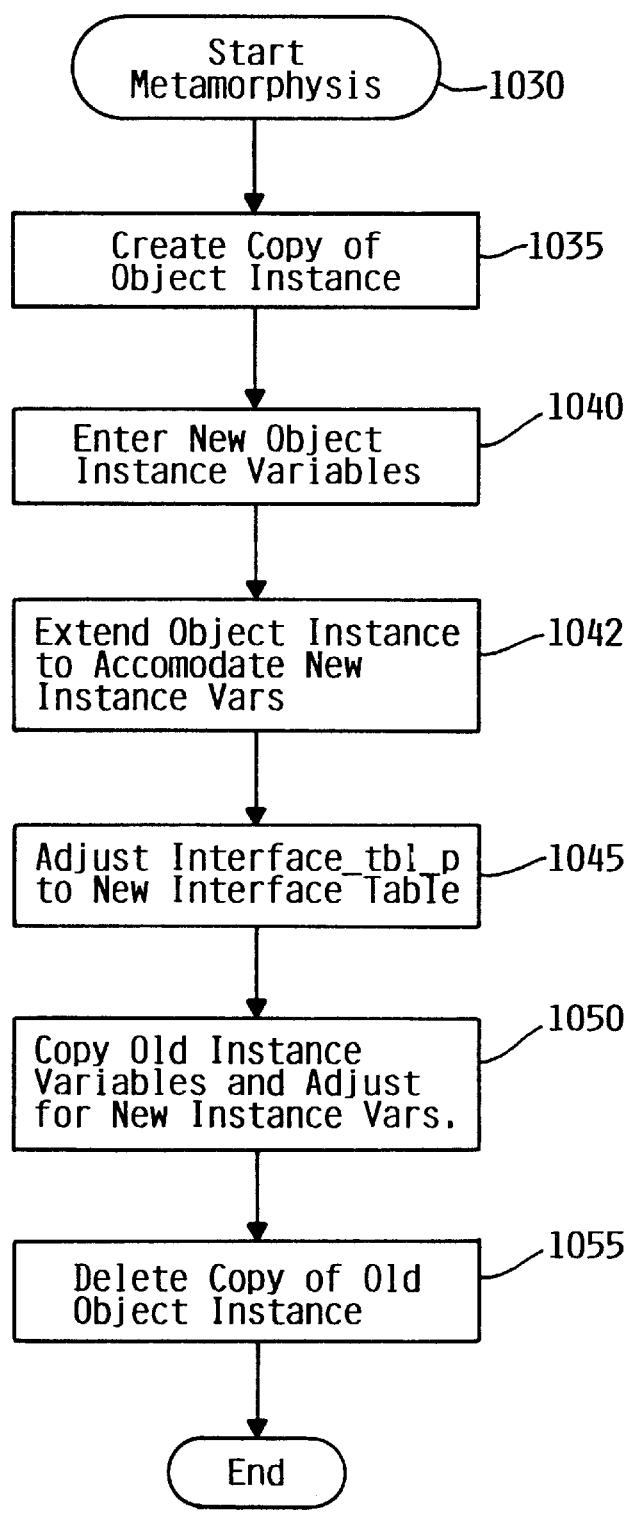

As stated, NOM metamorphosis is used to change the version of a particular object instance. Consider object instance Steve, for example. Company XYZ has just received word from the Patent and Trademark Office that a patent application on which engineer Steve was a named inventor has just been allowed. Company XYZ must, then, update the object instance that represents engineer Steve to be of class Engineer_II so that the new patent information may be added. FIGS. 10A and 10B show how metamorphosis takes place.

To initiate the process, a client program invokes the metamorphosis method program via the metamorph_p pointer in method table 1015 (as shown on FIG. 10A). The way in which this method program is invoked is identical to that described in the text accompanying FIGS. 8A and 8B. FIG. 10B is a flow diagram of the metamorph method program. The metamorph method program first creates a copy of object instance Steve (block 1035). This copy is shown on FIG. 10A as object copy 1020. The metamorph method program next prompts the user for the values associated with the new instance variables defined for class Engineer_II (block 1040) and extends the object instance to accommodate the new instance variables (block 1042). Then, the metamorph method program redefines interface_tbl_p (shown as 1007 in FIG. 10A) to point to the interface table for class Engineer_II (i.e., interface table 1010 on FIG. 5A) instead of the interface table for class Engineer (i.e., interface table 1005 on FIG. 10A). This is shown at 1004 on FIG. 10A. The metamorph method program then proceeds to copy the old instance variable values from object instance copy (block 1020) back into object instance 1000 (as shown on FIG. 10A) while adjusting for the new object instance variable values (block 1050). Once this is accomplished, the copy of the object instance is deleted (block 1055). At this point, object instance Steve is fully operable as an object of class Engineer_II.

ALTERNATE EMBODIMENT

In an alternate embodiment, the "versioning" of the present invention does not involve the creation of a new class object for each version (as described in blocks 956 and 958 of FIG. 9B and the accompanying text). Instead, after version manager 110 has been invoked in the standard manner (see FIG. 9B and the accompanying text), the existing class object is modified to include the new instance variable definitions. At this point processing continues as discussed in the preferred embodiment. Since the interface table pointer will be adjusted to point to the new interface table for the new version (see block 962 of FIG. 9B), the outcome will be the same without the need to have multiple class objects to represent multiple versions of the same class. As subclasses are "versioned", subclass class objects undergo the same modifications until all the subclasses have been "versioned".

Although a specific embodiment and an alternate embodiment have been disclosed, it will be understood by those skilled in the art that additional variations in form and detail may be made within the scope of the following claims.

What is claimed is:

1. A method for modifying an object instance, said object instance being a member of a first class, said method comprising the step of:
    changing said object instance such that said object instance is a member of a second class.

2. The method of claim 1 wherein said changing step further comprises the steps of:
    copying said object instance to form a temporary object instance, said object instance containing old instance variables;
    adjusting said object instance to include new instance variables and said old instance variables, said old instance variables being obtained from said temporary object instance;
    changing location information in said object instance to point to a new interface table; and
    deleting said temporary object instance.

3. An apparatus for modifying an object instance, said object instance being a member of a first class, said apparatus comprising:
    means for determining that said object instance requires modification; and
    means for changing said object instance such that said object instance is a member of second class.

4. The apparatus of claim 3 wherein said means for changing further comprises:
    means for copying said object instance to form a temporary object instance, said object instance containing old instance variables;
    means for adjusting said object instance to include new instance variables and said old instance variables, said old instance variables being obtained from said temporary object instance;
    means for changing location information in said object instance to point to a new interface table; and
    means for deleting said temporary object instance.

5. A method for modifying an object instance, said object instance being a member of a first version of a first class, said method comprising the step of:
    changing said object instance such that said object instance is a member of a second version of said first class.

6. The method of claim 5 wherein said changing step further comprises the steps of:
    copying said object instance to form a temporary object instance, said object instance containing old instance variables;
    adjusting said object instance to include new instance variables and said old instance variables, said old instance variables being obtained from said temporary object instance;
    changing location information in said object instance to point to a new interface table; and
    deleting said temporary object instance.

7. An apparatus for modifying an object instance, said object instance being a member of a first version of a first class, said apparatus comprising:
    means for determining that said object instance requires modification; and
    means for changing said object instance such that said object instance is a member of second version of said first class.

8. The apparatus of claim 7 wherein said means for changing further comprises:
    means for copying said object instance to form a temporary object instance, said object instance containing old instance variables;
    means for adjusting said object instance to include new instance variables and said old instance variables, said old instance variables being obtained from said temporary object instance;
    means for changing location information in said object instance to point to a new interface table; and
    means for deleting said temporary object instance.

* * * * *